(12) United States Patent
Pu et al.

(10) Patent No.: US 12,191,752 B2
(45) Date of Patent: Jan. 7, 2025

(54) MOTOR AND VEHICLE

(71) Applicants: ANHUI WELLING AUTO PARTS CO., LTD., Anhui (CN); GUANGDONG WELLING AUTO PARTS CO., LTD., Guangdong (CN)

(72) Inventors: Xiaomin Pu, Anhui (CN); Fei Wang, Anhui (CN); Jinjun Gao, Anhui (CN); Yiming Hu, Anhui (CN); Jintao Chen, Anhui (CN)

(73) Assignees: ANHUI WELLING AUTO PARTS CO., LTD., Anhui (CN); GUANGDONG WELLING AUTO PARTS CO., LTD., Guangdong (CN)

(*) Notice: Subject to any disclaimer, the term of this patent is extended or adjusted under 35 U.S.C. 154(b) by 236 days.

(21) Appl. No.: 17/994,909

(22) Filed: Nov. 28, 2022

(65) Prior Publication Data

US 2023/0116766 A1 Apr. 13, 2023

Related U.S. Application Data

(63) Continuation of application No. PCT/CN2021/110151, filed on Aug. 2, 2021.

(30) Foreign Application Priority Data

Aug. 3, 2020 (CN) .......................... 202010768985.8
Aug. 3, 2020 (CN) .......................... 202010768996.6
(Continued)

(51) Int. Cl.
*H02K 9/19* (2006.01)
*H02K 1/20* (2006.01)
(Continued)

(52) U.S. Cl.
CPC ................. *H02K 9/19* (2013.01); *H02K 1/20* (2013.01); *H02K 1/32* (2013.01); *H02K 5/203* (2021.01);
(Continued)

(58) Field of Classification Search
CPC ............ H02K 9/19; H02K 5/203; H02K 1/20; H02K 1/32; H02K 2213/03
See application file for complete search history.

(56) References Cited

U.S. PATENT DOCUMENTS

2017/0194845 A1  7/2017  Tang et al.
2020/0204044 A1  6/2020  Lee et al.

FOREIGN PATENT DOCUMENTS

CN     101777816 A     7/2010
CN     104333152 A     2/2015
(Continued)

OTHER PUBLICATIONS

Written opinion of the International Searching Authority dated Sep. 15, 2021 received in International Application No. PCT/CN2021/110151.
(Continued)

*Primary Examiner* — Forrest M Phillips
(74) *Attorney, Agent, or Firm* — Scully, Scott, Murphy & Presser, P.C.

(57) ABSTRACT

A motor and a vehicle are provided. The motor has a housing, a stator, a first end cove, a second end cover, a first oil injection ring, a rotor, a first end plate, and a second end plate. The rotor includes a rotor core, a rotor oil path formed in the rotor core, a rotor magnet steel, a rotation shaft, and a rotation shaft oil path formed in the rotation shaft. A first oil groove is defined on an inner side surface of the first end plate opposite to the rotor core, and is in communication with the rotation shaft oil path and the rotor oil path,
(Continued)

respectively. A first end plate oil outlet is defined in an outer side surface of the first end plate and communicates the first oil groove with an inner cavity of the housing.

24 Claims, 22 Drawing Sheets

(30) Foreign Application Priority Data

| | | | |
|---|---|---|---|
| Aug. 3, 2020 | (CN) | ......................... | 202010771190.2 |
| Aug. 3, 2020 | (CN) | ......................... | 202021586504.3 |
| Aug. 3, 2020 | (CN) | ......................... | 202021586521.7 |
| Aug. 3, 2020 | (CN) | ......................... | 202021586556.0 |
| Aug. 3, 2020 | (CN) | ......................... | 202021586557.5 |
| Aug. 3, 2020 | (CN) | ......................... | 202021586558.X |

(51) Int. Cl.
  *H02K 1/32* (2006.01)
  *H02K 5/20* (2006.01)

(52) U.S. Cl.
  CPC ..... *H02K 2209/00* (2013.01); *H02K 2213/03* (2013.01)

(56) References Cited

FOREIGN PATENT DOCUMENTS

| | | | |
|---|---|---|---|
| CN | 204156623 U | 2/2015 |
| CN | 204243921 U | 4/2015 |
| CN | 204906112 U | 12/2015 |
| CN | 106300853 A | 1/2017 |
| CN | 206211715 U | 5/2017 |
| CN | 106936230 A | 7/2017 |
| CN | 206302222 U | 7/2017 |
| CN | 206575298 U | 10/2017 |
| CN | 206878646 U | 1/2018 |
| CN | 207426824 U | 5/2018 |
| CN | 207939351 U | 10/2018 |
| CN | 207939353 U | 10/2018 |
| CN | 109120081 A | 1/2019 |
| CN | 109327113 A | 2/2019 |
| CN | 109617272 A | 4/2019 |
| CN | 109861441 A | 6/2019 |
| CN | 109936241 A | 6/2019 |
| CN | 209150806 U | 7/2019 |
| CN | 110138145 A | 8/2019 |
| CN | 110266127 A | 9/2019 |
| CN | 111478521 A | 7/2020 |
| CN | 210957944 U | 7/2020 |
| CN | 210985872 U | 7/2020 |
| CN | 212695852 U | 3/2021 |
| CN | 212909262 U | 4/2021 |
| CN | 213185796 U | 5/2021 |
| CN | 213243760 U | 5/2021 |
| EP | 3633827 A1 | 4/2020 |
| EP | 3687038 A1 | 7/2020 |
| GB | 2096409 A | 10/1982 |
| JP | 2010028908 A | 2/2010 |
| JP | 2010075011 A | 4/2010 |
| JP | 2011188686 A | 9/2011 |
| JP | 2013013182 A | 1/2013 |
| JP | 6221947 B2 | 11/2017 |
| WO | 2010128632 A1 | 11/2010 |
| WO | 2019184580 A1 | 10/2019 |

OTHER PUBLICATIONS

Office Action dated Nov. 23, 2023 received in European Patent Application No. EP 21853343.8.
Notification to Grant Patent Right for Invention dated May 9, 2024 received in Chinese Patent Application No. 202010771190.2.
Notification to Grant Patent Right for Invention dated May 14, 2024 received in Chinese Patent Application No. 202010768985.8.
Supplementary European Search Report dated Aug. 16, 2023 received in European Patent Application No. EP 21853052.5.
Supplementary European Search Report dated Aug. 22, 2023 received in European Patent Application No. EP 21853343.8.
International Search Report dated Oct. 19, 2021 received in International Application No. PCT/CN2021/110150.
International Search Report dated Sep. 15, 2021 received in International Application No. PCT/CN2021/110151.

MOTOR AND VEHICLE

CROSS-REFERENCE TO RELATED APPLICATIONS

This application is a continuation of PCT International Application No. PCT/CN2021/110151, filed on Aug. 2, 2021, which claims priority to and benefits of Chinese Patent Application No. 202010768985.8, Chinese Patent Application No. 202021586556.0, Chinese Patent Application No. 202021586521.7, Chinese Patent Application No. 202021586504.3, Chinese Patent Application No. 202010771190.2, Chinese Patent Application No. 202021586557.5, Chinese Patent Application No. 202010768996.6 and Chinese Patent Application No. 202021586558.X, the contents of each of which are incorporated herein by reference in their entirety for all purposes. No new matter has been introduced.

FIELD

The present disclosure relates to the field of motor technologies, and more particularly, to a motor and a vehicle having the motor.

BACKGROUND

At present, a drive motor of a new energy automobile gradually tends to have a high-power density and a high speed, which also proposes higher requirements for heat dissipation capability of the motor. A high heat of the motor would directly affect service life of an insulation material of the motor and operation reliability of the motor. Especially for the motor, a high temperature would increase a demagnetization risk of a permanent magnet and reduce performance of the permanent magnet. Since heat cannot be directly transferred with outside at an end area of a stator winding of the motor, the motor has the highest temperature at that end area of the stator winding.

A method for oil-cooling the motor in the related art mainly aims at cooling a stator, in which an oil path is designed inside a housing, and a drainage structure is additionally provided above the winding. Or, an oil-bath method is used, in which cooling oil is added into the motor to immerse a rotor within the cooling oil, and the oil is thrown onto the motor for cooling via a rotation of the rotor; or cooling is implemented by connecting oil paths of the stator and the oil paths of rotor in series. However, there are defects in the above multiple methods, such as increased volume of the motor, a complex structure, an uneven air gap of the motor, oil backlog, and the like.

SUMMARY

The present disclosure aims to solve at least one of the technical problems in the related art to some extent.

To this end, embodiments of the present disclosure provide a motor with an improved cooling effect.

Embodiments of the present disclosure further provide a vehicle having the above motor.

In a first aspect according to embodiments of the present disclosure, a motor is provided. The motor includes: a housing having an inner cavity and a housing oil inlet; a stator including a stator core and a stator winding, the stator being disposed in the inner cavity of the housing, a cooling oil channel being defined between an outer peripheral wall of the stator core and an inner peripheral wall of the housing, the cooling oil channel being in communication with the housing oil inlet; a first end cover mounted at a first end of the housing; a second end cover mounted at a second end of the housing; the second end cover having an end cover oil inlet; a first oil injection ring disposed on an inner side of the first end cover. An oil injection space is defined between an outer peripheral wall of the first oil injection ring and the inner peripheral wall of the housing. The oil injection space is in communication with the cooling oil channel. A plurality of first oil injection holes being disposed on the first oil injection ring and being arranged at intervals in a circumferential direction of the first oil injection ring. The plurality of first oil injection holes being in communication with the oil injection space to allow cooling oil to be injected from an outer periphery of the stator towards a first end of the stator winding. A rotor including a rotor core, a rotor magnet steel, and a rotation shaft, a rotor oil path being disposed in the rotor core, a rotation shaft oil path being formed in the rotation shaft, a rotation shaft oil inlet and a rotation shaft oil outlet being disposed on the rotation shaft and being in communication with the rotation shaft oil path. A first end of the rotation shaft penetrating the first end cover and extending out of the housing, and the rotation shaft oil inlet being in communication with the end cover oil inlet; a first end plate disposed at a first end of the rotor core and engaged with the rotation shaft. A first oil groove being disposed on an inner side surface of the first end plate opposite to the rotor core and being in communication with the rotation shaft oil outlet and the rotor oil path, respectively, and a first end plate oil outlet being disposed on an outer side surface of the first end plate and configured to communicate the first oil groove with the inner cavity of the housing; and a second end plate disposed at a second end of the rotor core and engaged with the rotation shaft, a second oil groove being disposed on an inner side surface of the second end plate opposite to the rotor core and being in communication with the rotor oil path, and a second end plate oil outlet being disposed on an outer side surface of the second end plate and configured to communicate the second oil groove with the inner cavity of the housing.

In the motor according to certain embodiments of the present disclosure, the flow path of cooling fluid is long and thus, it has good heat dissipation effect on the housing, the stator, and the rotor. Especially for the stator winding with serious heat generation, it can get good cooling and temperature reduction through this multiple cooling function structure provide by the first oil injection hole, the first end plate oil outlet, and the second end plate oil outlet. Thus, the motor has higher heat dissipation performance. Meanwhile, the rotor magnet steel can be effectively cooled to reduce a temperature rise of the magnet steel. Thus, output performance of the motor under a high-speed operating condition can be improved. For a motor having a same volume, the motor according to certain embodiments of the present disclosure can have greater torque and power.

In some embodiments, the motor further includes a second oil injection ring disposed on an inner side of the second end cover. The oil injection space in communication with the cooling oil channel is defined between an outer peripheral wall of the second oil injection ring and the inner peripheral wall of the housing. A plurality of second oil injection holes is disposed on the second oil injection ring, and is arranged at intervals in a circumferential direction of the second oil injection ring. The plurality of second oil injection holes is in communication with the oil injection space to allow the cooling oil to be injected from the outer periphery of the stator towards a second end of the stator winding.

In some embodiments, the first oil injection ring is detachably mounted on the first end cover, or the first oil injection ring and the first end cover are integrally formed; and/or the second oil injection ring is detachably mounted on the second end cover, or the second oil injection ring and the second end cover are integrally formed.

In some embodiments, each of the plurality of first oil injection holes has a circular cross-section. A cross-section area of the one of two adjacent first oil injection holes which is at a higher position is greater than a cross-section area of the other of the two adjacent first oil injection holes at a lower position; and/or each of the plurality of second oil injection holes has a circular cross-section, and a cross-section area of the one of two adjacent second oil injection holes which is at a higher position is greater than a cross-section area of the other of the two adjacent second oil injection holes which is at a lower position.

In some embodiments, the first oil injection ring is divided into a first upper ring segment located above a center of the first oil injection ring, and a first lower ring segment located below the center of the first oil injection ring. A cross-section area of each first oil injection hole of the first upper ring segment gradually increases in a radial direction of the first oil injection ring from outside to inside, and a cross-section area of each first oil injection hole of the first lower ring segment gradually decreases in the radial direction of the first oil injection ring from outside to inside. And/or the second oil injection ring is divided into a second upper ring segment located above a center of the second oil injection ring, and a second lower ring segment located below the center of the second oil injection ring. A cross-section area of each second oil injection hole of the second upper ring segment gradually increases in a radial direction of the second oil injection ring from outside to inside, and a cross-section area of each second oil injection hole of the second lower ring segment gradually decreases in the radial direction of the second oil injection ring from outside to inside.

In some embodiments, the first oil groove includes: a first guide groove; a first communication groove, the first communication groove having a first end in communication with the rotation shaft oil outlet, and a second end in communication with the first guide groove; and a first oil outlet groove having a first end in communication with the first guide groove, and a second end in communication with the first end plate oil outlet. The second oil groove includes a second annular groove in communication with the rotor oil path; and a second oil outlet groove having a first end in communication with the second annular groove, and a second end in communication with the second end plate oil outlet.

In some embodiments, the first communication groove and the first oil outlet groove are staggered with each other in a radial direction of the first end plate.

In some embodiments, a plurality of first communication grooves is provided and arranged at intervals in a circumferential direction of the first end plate. The plurality of first communication grooves extends in the radial direction of the first end plate. A plurality of first oil outlet grooves is provided and arranged at intervals in the circumferential direction of the first end plate. The plurality of first oil outlet grooves extends in the radial direction of the first end plate. A plurality of second oil outlet grooves is provided and arranged at intervals in a circumferential direction of the second end plate. The plurality of second oil outlet grooves extends in a radial direction of the second end plate.

In some embodiments, a lead wire of the stator winding extends out of one side of the second end cover. The number of first end plates is N1 and the number of second end plates is N2 and N1<N2. These N1 first end plate oil outlets are provided and evenly arranged in a circumferential direction of the first end plate, and these N2 second end plate oil outlets are provided and evenly arranged in a circumferential direction of the second end plate.

In some embodiments, the first end plate oil outlet is provided in a smaller quantity than the second end plate oil outlet.

In some embodiments, a diameter of the first end plate oil outlet is smaller than a diameter of the second end plate oil outlet.

In some embodiments, both an outlet end of the first end plate oil outlet and an outlet end of the second end plate oil outlet are opened towards the stator.

In some embodiments, a stator groove and/or a flat portion extending in an axial direction of the stator core are disposed on the outer peripheral wall of the stator core. The cooling oil channel is defined by the stator groove and/or the flat portion.

In some embodiments, at least one stator circumferential groove is disposed on the outer peripheral wall of the stator core, and extends in a circumferential direction of the stator core, to divide the stator core into a plurality of non-groove core segments and at least one groove core segment in the axial direction of the stator core. The stator groove and/or the flat portion extending in the axial direction of the stator core and distributed at intervals in the circumferential direction of the stator core are disposed on outer peripheral walls of the plurality of non-groove core segments.

In some embodiments, the at least one groove core segment includes one groove core segment, and the plurality of non-groove core segments includes two non-groove core segments. The stator groove and/or the flat portion are disposed on an outer peripheral wall of each of the two non-groove core segments.

In some embodiments, the one groove core segment is located at an axial middle position of the stator core.

In some embodiments, a central axis of the housing oil inlet is located in a central cross-section of the one groove core segment.

In some embodiments, the stator groove has a rectangular shape. A depth of the stator groove satisfies a relationship of $$a = \frac{k_1 L h}{R_{out} - R_{in}},$$

where a is the depth of the stator groove, $R_{out}$ is an outer diameter of the stator, $R_{in}$ is an inner diameter of the stator, L is a yoke thickness of the stator, h is a stacking thickness of the stator, and $k_1$ is a coefficient ranging from 0.05 to 0.1.

In some embodiments, a depth of the flat portion satisfies a relationship of $$b = \frac{k_2 L h}{R_{out} - R_{in}},$$

where b is the depth of the flat portion, $R_{out}$ is the outer diameter of the stator, $R_{in}$ is the inner diameter of the stator, L is the yoke thickness of the stator, h is the stacking thickness of the stator, and $k_1$ is the coefficient ranging from 0.05 to 0.1.

In some embodiments, a plurality of stator grooves is divided into a plurality of groups of stator grooves evenly arranged at intervals in the circumferential direction of the stator core. A central angle $\theta_1$ corresponding to a spacing between adjacent groups of stator grooves ranges from 1 degree to 5 degrees.

In some embodiments, the plurality of groups of stator grooves is divided into first groove groups and second groove groups. The first groove groups and the second groove groups are arranged alternately in the circumferential direction of the stator core. The flat portion is located in the second groove groups. Each of the second groove groups is divided into two first sections adjacent to a corresponding first groove group and two second sections adjacent to a corresponding flat portion. The number of stator grooves of each of the first sections is greater than the number of stator grooves of each of the second sections. A central angle $\theta_{32}$ corresponding to a spacing between the first section and the second section that are adjacent to each other ranges from 1 degree to 5 degrees. A central angle $\theta_{42}$ corresponding to a spacing between the stator grooves of each section ranges from 0.5 degrees to 2 degrees. A central angle $\theta_{52}$ corresponding to each of the stator grooves ranges from 0.5 degrees to 2 degrees. Each of the first groove groups is divided into a plurality of sets. Each of the plurality of sets includes a plurality of sections. A central angle $\theta_{21}$ corresponding to a spacing groove between adjacent sets ranges from 1 degree to 5 degrees. A central angle $\theta_{31}$ corresponding to a spacing between adjacent sections of each of the plurality of sets ranges from 1 degree to 5 degrees. A central angle $\theta_{41}$ corresponding to a spacing between stator grooves of each of the plurality of sections of each of the plurality of sets ranges from 0.5 degrees to 2 degrees. A central angle $\theta_{51}$ corresponding to each of the stator grooves ranges from 0.5 degrees to 2 degrees.

In some embodiments, a depth of the stator groove ranges from 1.5 mm to 2.5 mm.

In some embodiments, a housing groove is disposed on the inner peripheral wall of the housing, and extends in a circumferential direction of the housing. The housing oil inlet is in communication with the housing groove.

In a second aspect according to some embodiments of the present disclosure, a vehicle is provided. The vehicle includes the motor according to some embodiments of the present disclosure in the first aspect.

Figure 1:
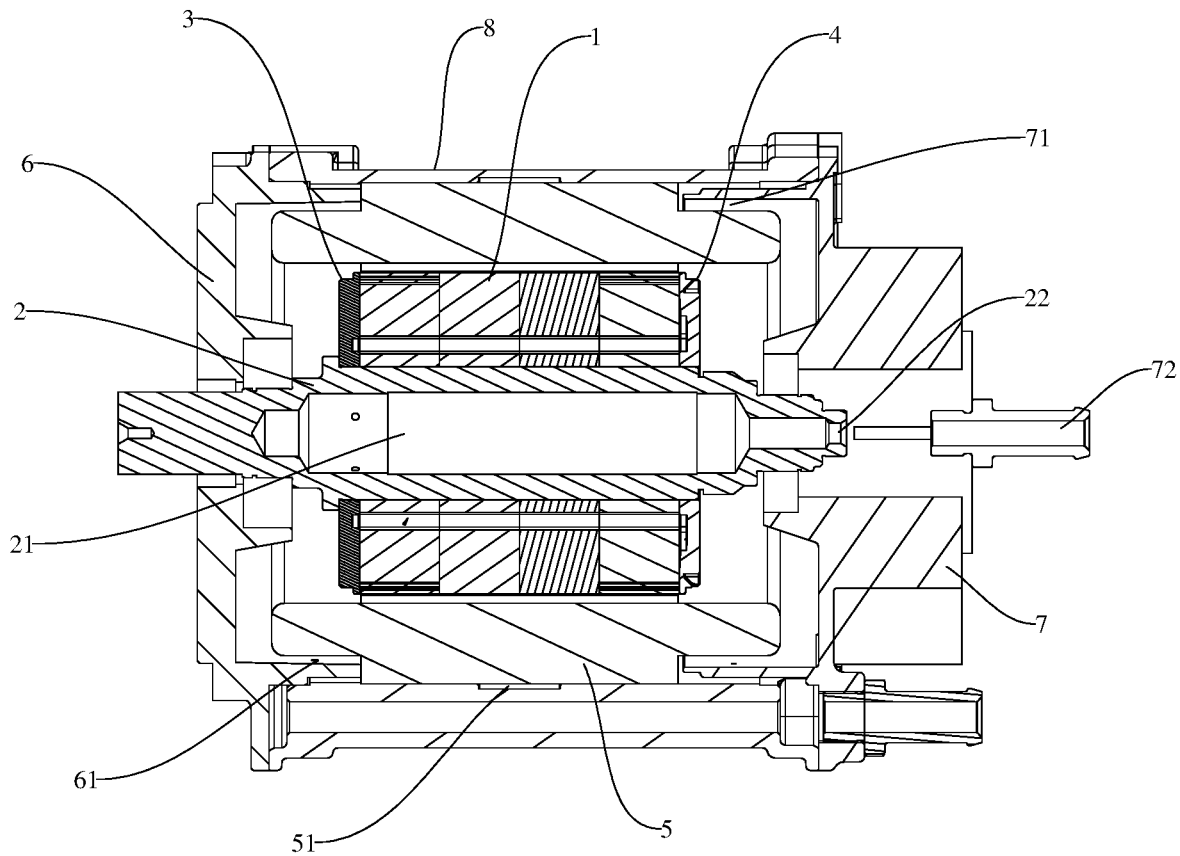
FIG. 1 is a schematic view showing a motor according to an embodiment of the present disclosure.

Reference numerals shown in the figures are provided as follows:
1. Rotor core; 11. Rotor oil path;
2. Rotation shaft; 21. Rotation shaft oil path; 22. Rotation shaft oil inlet; 23. Rotation shaft oil outlet;
3. First end plate; 31. First communication groove; 32. First guide groove; 33. First oil outlet groove; 34. First end plate oil outlet;
4. Second end plate; 41. Second communication groove; 42. Second annular groove; 43. Second oil outlet groove; 44. Second end plate oil outlet;
5. Stator core; 51. Cooling oil channel; 52. Stator groove; 521. First groove group; 522. Second groove group; 5221. First section; 5222. Second section; 53. Flat portion; 54. Stator circumferential groove;
6. First end cover; 61. First oil injection ring; 611. First oil injection hole;
7. Second end cover; 71. Second oil injection ring; 711. Second oil injection hole; 72. End cover oil inlet;
8. Housing; 80. Inner cavity; 81. Housing oil inlet; 82. Housing groove.

DETAILED DESCRIPTION

Embodiments of the present disclosure are described in detail below, examples of which are illustrated in the accompanying drawings. The embodiments described below with reference to the accompanying drawings are exemplary, and are intended to be used to explain the present disclosure, rather than being construed as a limitation to the present disclosure.

A motor according to embodiments of the present disclosure is described below with reference to the FIGS. 1 to 27.

Figure 2:
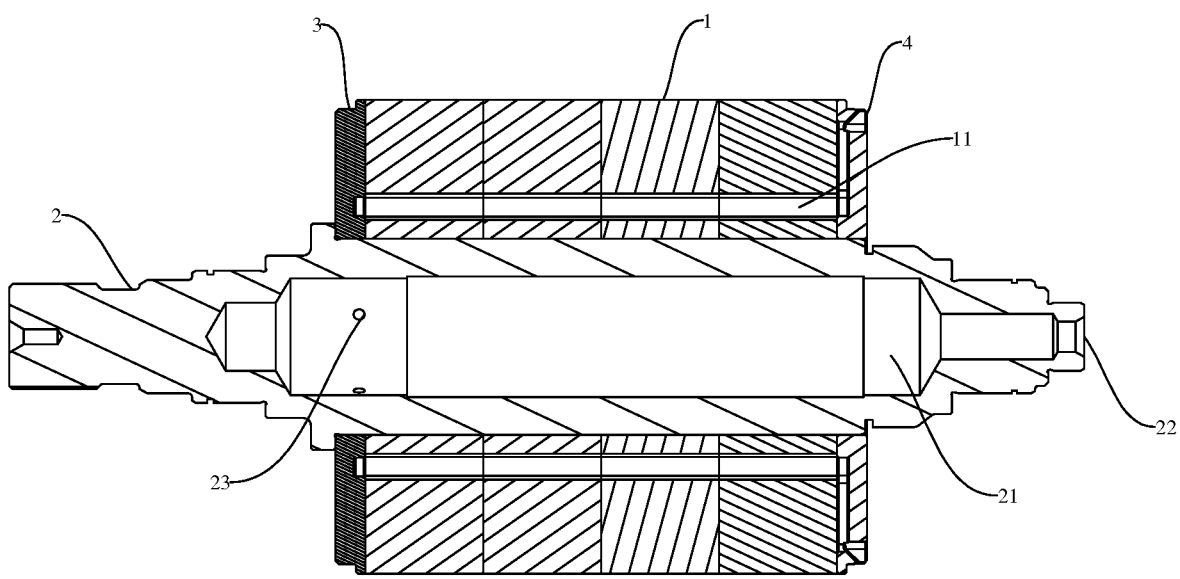
FIG. 2 is a schematic view showing a rotor and a rotation shaft according to an embodiment of the present disclosure.
Figure 4:
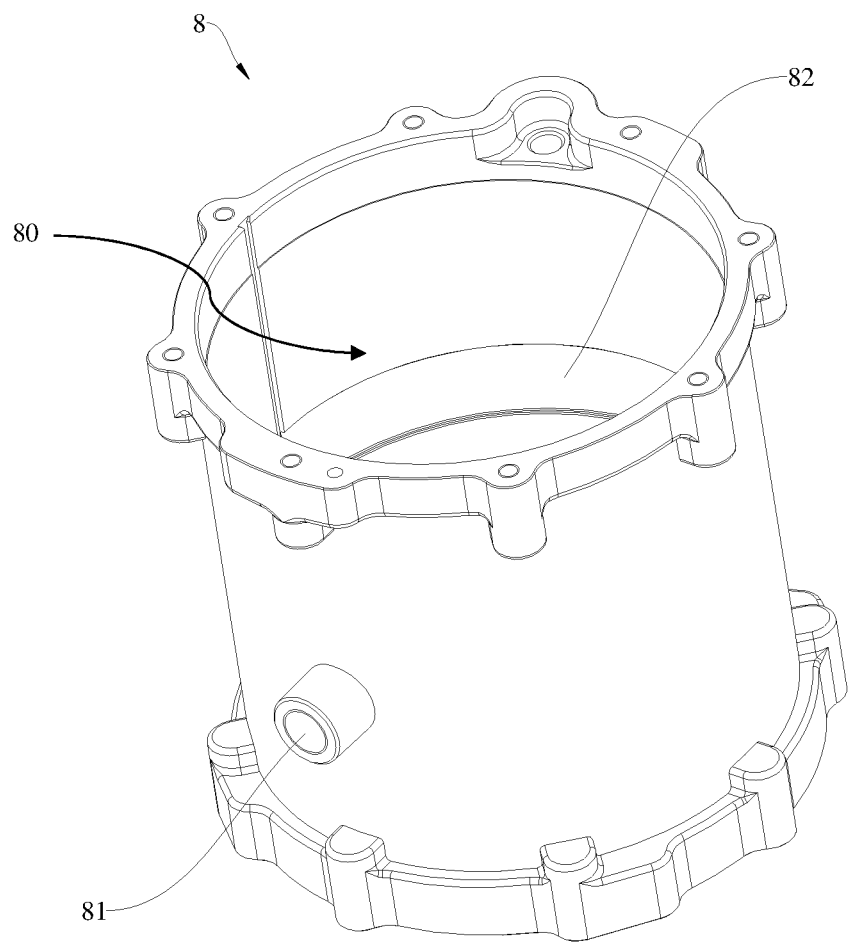
FIG. 4 is a schematic view showing a housing according to a first embodiment of the present disclosure.

As illustrated in FIG. 1, FIG. 2 and FIG. 4, a motor according to embodiments of the present disclosure includes a housing 8, a first end cover 6, a second end cover 7, a stator, and a rotor. The housing 8 has an inner cavity for accommodating components such as the stator and the rotor.

The first end cover 6 is disposed at a first end of the housing 8 (a left end in FIG. 1). A first oil injection ring 61 is disposed on an inner side of the first end cover 6. The second end cover 7 is disposed at a second end of 9 of the housing 8 (a right end in FIG. 1). The second end cover 7 has an end cover oil inlet 72. The stator consists of a stator core 5, and a stator winding stator winding wound around the stator core 5. A cooling oil channel 51 is disposed between an outer peripheral wall of the stator core 5 and an inner peripheral wall of the housing 8. The housing 8 has a housing oil inlet 81 which is in communication with the cooling oil channel 51.

The rotor is composed of a rotor core 1, a rotor magnet steel, and a rotation shaft 2. The rotor is disposed in the housing and is spaced apart from the stator. The rotor is disposed on an inner side of the stator. A rotor oil path 11 is formed in the rotor core 1.

Figure 5:
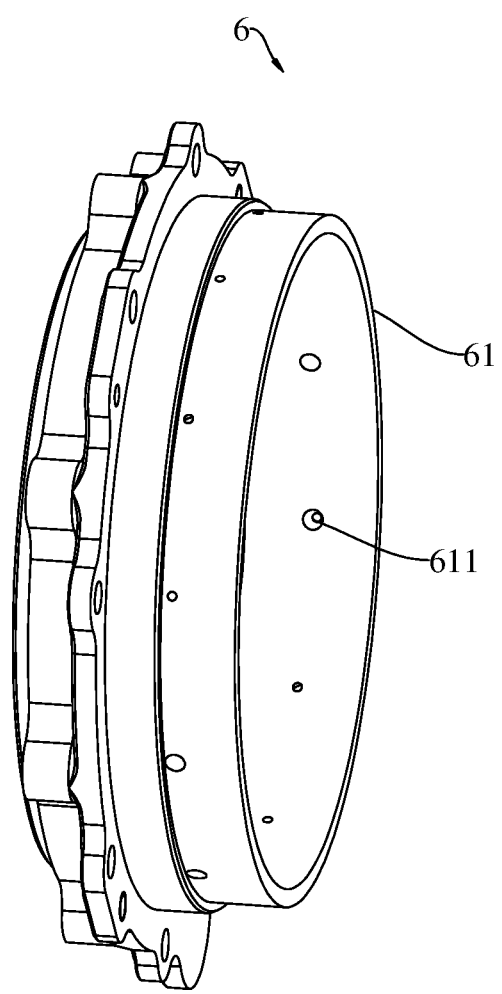
FIG. 5 is a schematic view showing a first end cover according to an embodiment of the present disclosure.

As illustrated in FIG. 5, an oil injection space in communication with the cooling oil channel 51 is defined between an outer peripheral wall of the first oil injection ring 61 and the inner peripheral wall of the housing 8. A plurality of first oil injection holes 611 is disposed on the first oil injection ring 61 and arranged at intervals in a circumferential direction of the first oil injection ring 61. The plurality of first oil injection holes 611 is in communication with the oil injection space to allow cooling oil to be injected from an outer periphery of the stator towards a first end of the stator winding.

Figure 3:
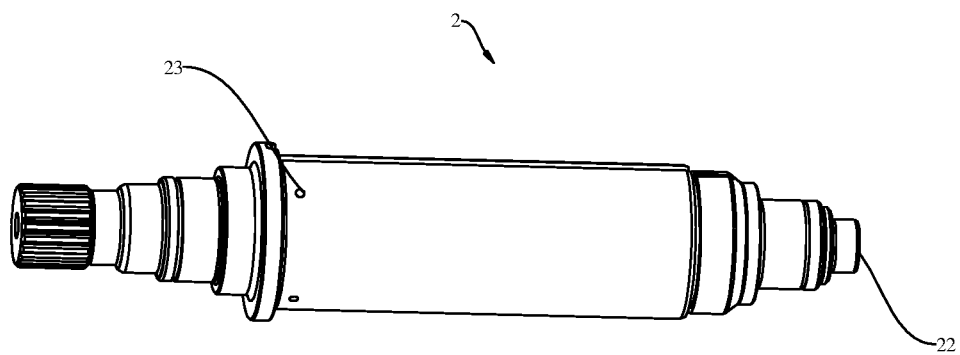
FIG. 3 is a schematic view showing a rotation shaft according to an embodiment of the present disclosure.

As illustrated in FIG. 3, the rotation shaft 2 penetrates the rotor core 1 and is engaged with the rotor core 1. A rotation shaft oil path 21 is formed in the rotation shaft 2. The rotation shaft 2 has a rotation shaft oil inlet 22 and a rotation shaft oil outlet 23 that are both in communication with the rotation shaft oil path 21 for feeding and discharging oil. A first end of the rotation shaft 2 perpetrates the first end cover 6 and extends out of the housing 8 to serve as an output shaft of the motor. The rotation shaft oil inlet 22 is in communication with the end cover oil inlet 72 disposed on the second end cover 7. It should be noted that, the rotation shaft oil inlet 22 is indirect communication with the end cover oil inlet 72 with a predetermined gap therebetween, which can avoid a fiction force from being generated due to a contact between the rotation shaft 2 and the second end cover 7, thereby affecting normal rotation of the rotation shaft. The cooling oil is injected into the rotation shaft oil inlet 22 through the end cover oil inlet 72 and enters the rotation shaft oil path.

The motor further includes a first end plate 3 and a second end plate 4. The first end plate 3 is disposed at a first end of the rotor core 1 and is sleeved over the rotation shaft 2. A first oil groove is disposed on an inner side surface of the first end plate 3. Here, the inner side surface refers to a surface of the first end plate 3 which is opposite to the rotor core 1. The first oil groove is in communication with the rotation shaft oil outlet 23 and the rotor oil path 11, respectively. A first end plate oil outlet 34 for communicating the first oil groove with the inner cavity of the housing 8 is disposed on an outer side surface of the first end plate 3. It should be understood that the first end plate oil outlet 34 is a through hole and penetrates the first end plate 3 in a thickness direction of the first end plate, and one end of the first end plate oil outlet 34 is in communication with the first oil groove.

Similarly, a second end plate 4 is disposed at a second end of the rotor core 1 and is sleeved over the rotation shaft 2. A second oil groove is disposed on an inner side surface of the second end plate 4, and is in communication with the rotor oil path 11. A second end plate oil outlet 44 is disposed on the second end plate 4, and is in communication with the second oil groove.

The motor according to certain embodiments of the present disclosure includes three cooling oil paths including the cooling oil channel, the rotor oil path, and the rotation shaft oil path. The cooling oil channel is capable of mainly cooling the housing, the stator core, and the stator winding. The rotor oil path and the rotation shaft oil path are capable of cooling the rotor core, the rotor magnet steel, and the stator winding.

In some embodiments of the present disclosure, the cooling oil enters the cooling oil channel through the housing oil inlet 81, and cools the stator core 5 and the housing 8 firstly. Then, the cooling oil flows towards a first end of the stator core 5 into the oil injection space, and enters the first oil injection hole 611 through the oil injection space. The cooling oil may be injected towards the first end of the stator winding through the first oil injection hole 611 under external pressure and gravity, to cool the first end of the stator winding.

The rotation shaft oil path 21 is in communication with the rotor oil path 11 through the rotation shaft oil outlet 23. The communication herein is an indirect communication. After entering the rotation shaft oil path 21, the cooling oil first cools the rotation shaft 2 for heat dissipation, then flows from a rotation shaft oil outlet into the first oil groove. The cooling oil is partially thrown into the inner cavity of the housing 8 at the first end through the first end plate oil outlet 34 under centrifugal force to cool the stator winding in the inner cavity. The remaining cooling oil enters the rotor oil path 11 through the first oil groove to cool the rotor core 1 and the rotor magnet steel, then flows into the second oil groove of the second end plate through the rotor oil path 11, and is finally thrown into the inner cavity of the housing 8 at the second end through the second end plate oil outlet 44 to cool the stator winding. Finally, the cooling oil in the inner cavity of the housing 8 enters an oil return pipeline through an end cover oil outlet (not illustrated), and enters each oil path again after being cooled. It should be noted that, due to a rotation movement of the rotation shaft and the rotor core 1, the cooling oil entering the inner cavity of the housing 8 through the first end plate oil outlet 34 and the second end plate oil outlet 44 can be thrown into the inner cavity of the housing. Therefore, the stator winding located on an outer peripheral side of the rotor core 1 can be better cooled, thus, the cooling effect is improved.

The motor according to certain embodiments of the present disclosure has a cooling fluid flow path, the rotation shaft oil path, and the rotor oil path. The cooling fluid flow path is long, which has a good heat dissipation effect on each of the housing, the stator, and the rotor, especially for the stator winding with serious heat generation, and multiple cooling and temperature reduction is performed on the stator winding through the first oil injection hole, the first end plate oil outlet, and the second end plate oil outlet. Thus, the motor has better heat dissipation performance Meanwhile, the rotor magnet steel can be effectively cooled, and a temperature rise of a magnet steel is reduced, to improve output performance of the motor in a high-speed operating condition. For a motor with a same volume, the motor according to certain embodiments of the present disclosure has greater torque and power.

Figure 6:
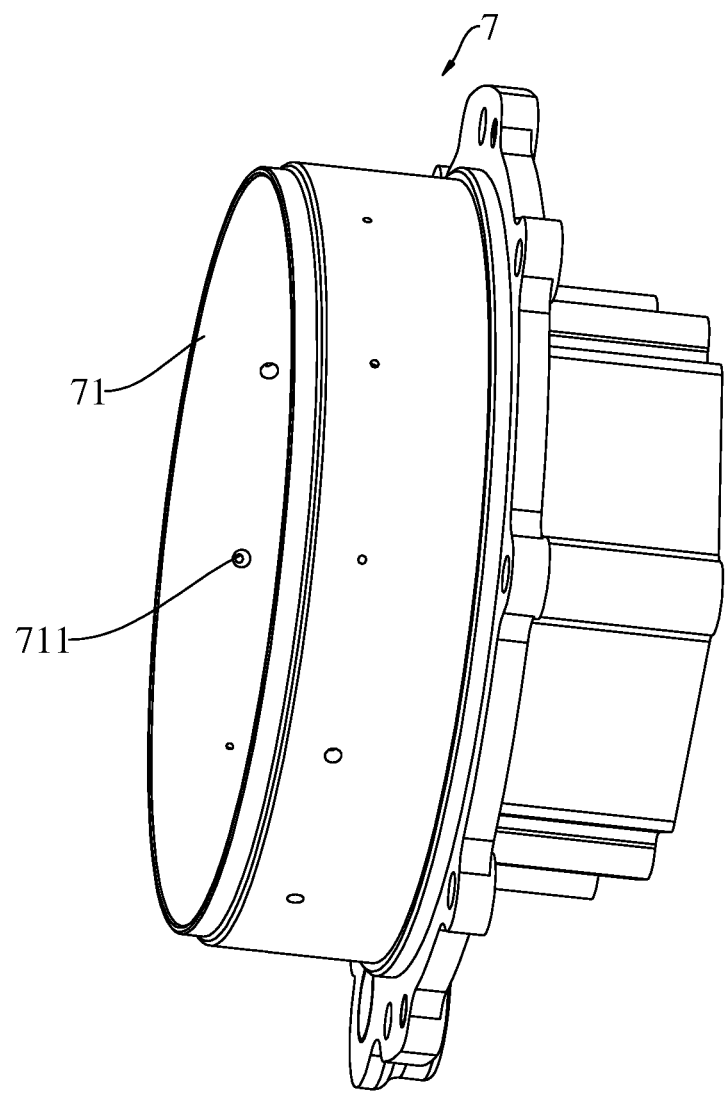
FIG. 6 is a schematic view showing a second end cover according to an embodiment of the present disclosure.

As illustrated in FIG. 6, in some embodiments, a second oil injection ring 71 is disposed on an inner side of the second end cover 7. Similarly, an oil injection space in communication with the cooling oil channel 51 is defined between an outer peripheral wall of the second oil injection ring 71 and the inner peripheral wall of the housing 8. A plurality of second oil injection holes 711 is disposed on the second oil injection ring 71 and arranged at intervals in a circumferential direction of the second oil injection ring 71. The plurality of second oil injection holes 711 is in communication with the oil injection space to allow the cooling oil to be injected from the outer periphery of the stator towards a second end of the stator winding.

A fluid outlet end of the cooling oil channel 51 is located at an end part of the stator core 5, and is in communication with the oil injection spaces at two ends. The cooling oil respectively enters the first oil injection hole 611 and the second oil injection hole 711 through the first oil injection ring 61 and the second oil injection ring 71, and is injected through the first oil injection hole 611 and the second oil injection hole 711. Therefore, the first end of the stator winding is cooled by the first oil injection ring 61, and a second end of the stator winding is cooled by the second oil injection ring 71. Thus, an overall cooling effect is better, and the cooling efficiency can be adjusted through pressure and flow rate of external cooling oil, which can avoid low cooling efficiency due to the controlling on the oil throwing by a rotation speed of the motor, and improve controllability. In addition, the cooling oil channel 51 directly delivers the cooling oil to the end of the stator winding. Thus, strong cooling pertinence can be provided, and the cooling effect and performance of the motor can be further improved.

In some embodiments, the first oil injection ring 61 is detachably connected to the first end cover 6. The first oil injection ring 61 is detachably mounted on an inner side surface of the first end cover 6. The second oil injection ring 71 is detachably mounted on an inner side surface of the second end cover 7. In some embodiments of the present disclosure, the first oil injection ring 61 may be non-detachably mounted on the inner side surface of the first end cover 6 after processed separately. The second oil injection ring 71 may be non-detachably mounted on the inner side surface of the second end cover 7 after processed separately.

In some embodiments, the first oil injection ring 61 and the first end cover 6 are integrally formed, and the second oil injection ring 71 and the second end cover 7 are integrally formed. Therefore, it is possible to provide a stable structure and high strength. Further, the oil injection rings can bear greater pressure and thus have high reliability.

Figure 20:
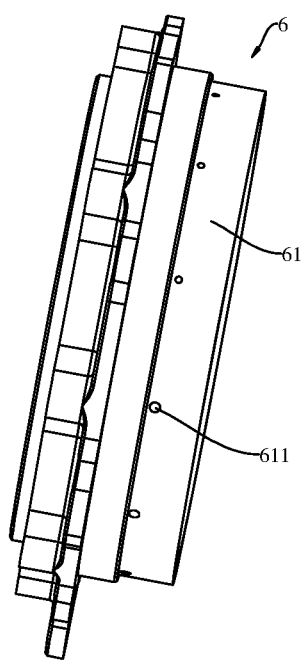
FIG. 20 is a schematic view showing a first end cover according to another embodiment of the present disclosure.
Figure 21:
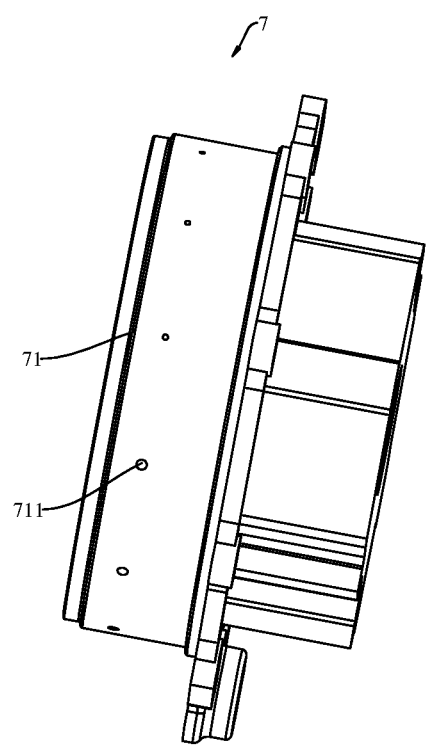
FIG. 21 is a schematic view showing a second end cover according to another embodiment of the present disclosure.

As illustrated in FIG. 20 and FIG. 21, in some embodiments, each of the plurality of first oil injection holes 611 has a circular cross-section. A cross-section area of one of two adjacent first oil injection holes 611 which is at a higher position is greater than a cross-section area of the lower one of the two adjacent first oil injection holes 611. Similarly, each of the plurality of second oil injection holes 711 has a circular cross-section. A cross-section area of one of two adjacent second oil injection holes 711 which is at a higher position is greater than a cross-section area of the other of the lower one of the two adjacent second oil injection holes 711.

Since the housing oil inlet 81 is located at a top of the housing 8, pressure of the first oil injection holes 611 and the second oil injection holes 711 close to an upper part is great, and pressure of the first oil injection holes 611 and the second oil injection holes 711 close to a lower part is small. By arranging the cross-section areas of the first oil injection holes 611 and the second oil injection holes 711 as described above, injection balance rates of the cooling oil can be ensured, and the cooling effect can be improved.

Figure 5A:
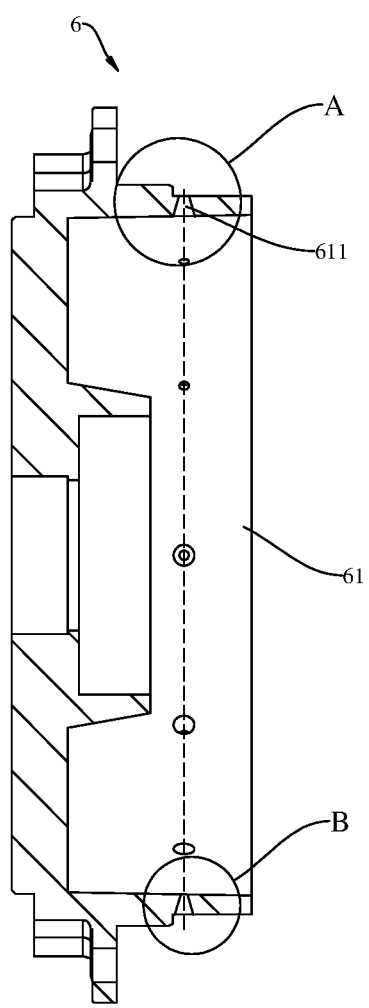
FIG. 5a is a cross-sectional view of a first end cover according to an embodiment of the present disclosure.
Figure 5B:
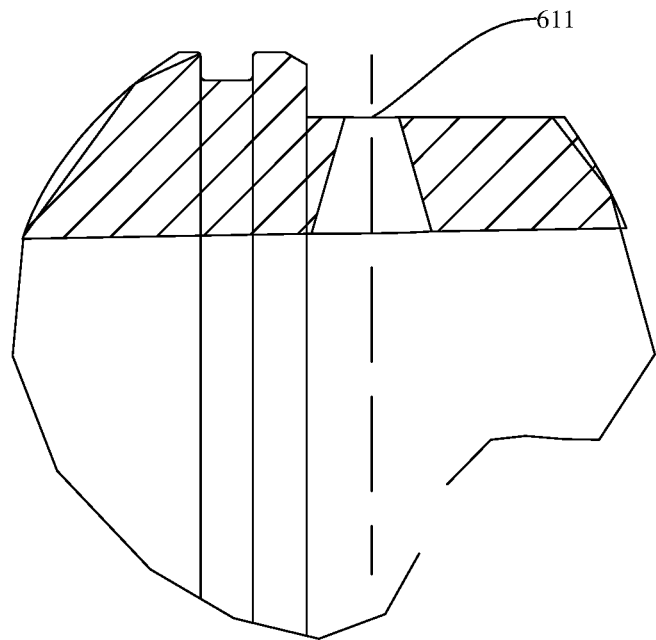
FIG. 5b is a partial view A of a cross-sectional view of a first end cover according to an embodiment of the present disclosure.
Figure 5C:
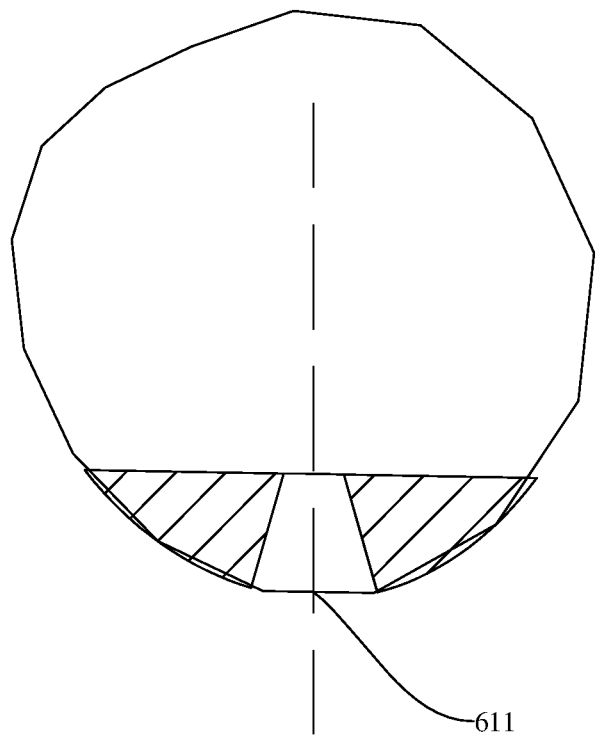
FIG. 5c is a partial view B of a cross-sectional view of a first end cover according to an embodiment of the present disclosure.
Figure 6A:
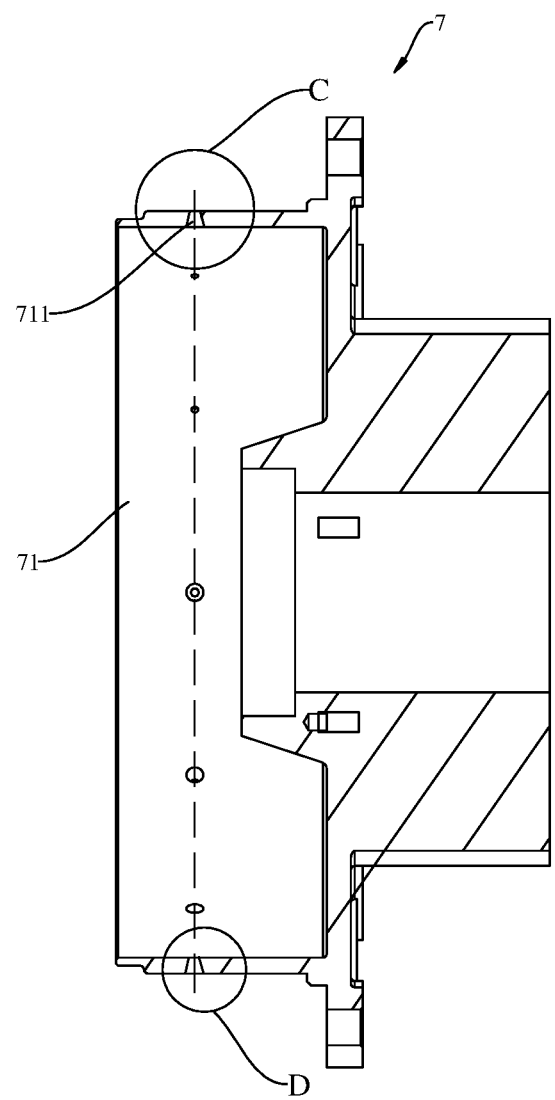
FIG. 6a is a cross-sectional view of a second end cover according to an embodiment of the present disclosure.
Figure 6B:
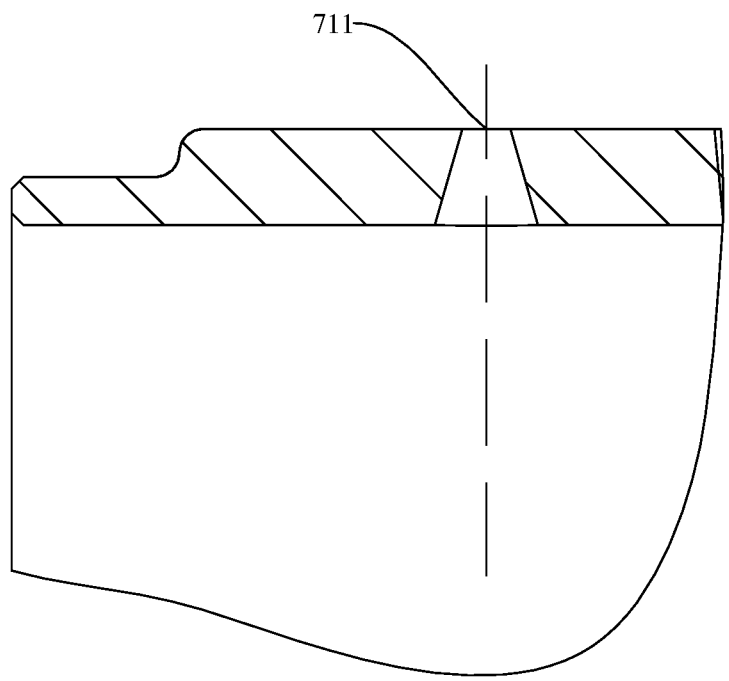
FIG. 6b is a partial view C of a cross-sectional view of a second end cover according to an embodiment of the present disclosure.
Figure 6C:
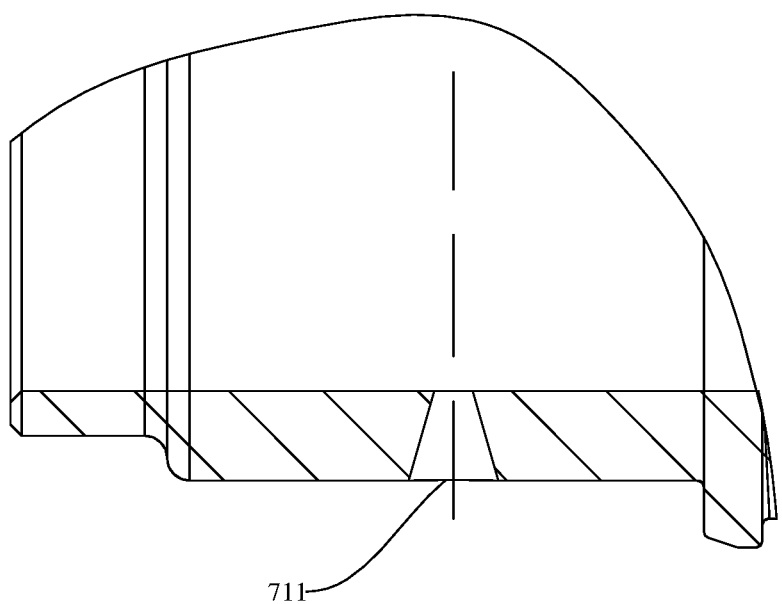
FIG. 6c is a partial view D of a cross-sectional view of a second end cover according to an embodiment of the present disclosure.

As illustrated in FIG. 5a, FIG. 5b and FIG. 5c, in some embodiments, the first oil injection ring 61 is divided into a first upper ring segment located above a center of the first oil injection ring, and a first lower ring segment located below the center of the first oil injection ring. A cross-section area of each first oil injection hole 611 of the first upper ring segment gradually increases in a radial direction of the first oil injection ring from outside to inside. That is, each first oil injection hole 611 of the first upper ring segment has a conical shape gradually expanding from outside to inside. A cross-section area of each first oil injection hole of the first lower ring segment gradually decreases in the radial direction of the first oil injection ring from outside to inside. That is, each first oil injection hole 611 of the first lower ring segment has a conical shape gradually tapering from outside to inside. Similarly, as illustrated in FIG. 6a, FIG. 6b and FIG. 6c, in some embodiments, the second oil injection ring 71 is divided into a second upper ring segment located above a center of the second oil injection ring, and a second lower ring segment located below the center of the second oil injection ring. A cross-section area of each second oil injection hole of the second upper ring segment gradually increases in a radial direction of the second oil injection ring from outside to inside. That is, each second oil injection hole 711 of the second upper ring segment is a conical shape gradually expanding from outside to inside. A cross-section area of each second oil injection hole of the second lower ring segment gradually decreases in the radial direction of the second oil injection ring from outside to inside. That is, each second oil injection hole 711 of the second lower ring segment is a conical shape gradually tapering from outside to inside.

Therefore, the shape of each first oil injection holes and each second oil injection hole located on the first upper ring segment and the second upper ring segment gradually increases from outside to inside. The cooling fluid from an upper side flows to the end of the stator winding through the conical holes mainly under the force of gravity. Thus, an injection range is greater to bring the cooling fluid to be in full contact with the end of the stator winding. The shape of each of the first oil injection holes and the second oil injection holes located on the first upper ring segment and the second upper ring segment gradually decreases from outside to inside. A flow velocity of the cooling fluid from a lower side become great after the cooling fluid flows through the inverted conical holes under an external pressure as a main force, and can be further injected onto an outer side of the end of the stator winding to further improve the cooling effect.

Figure 7:
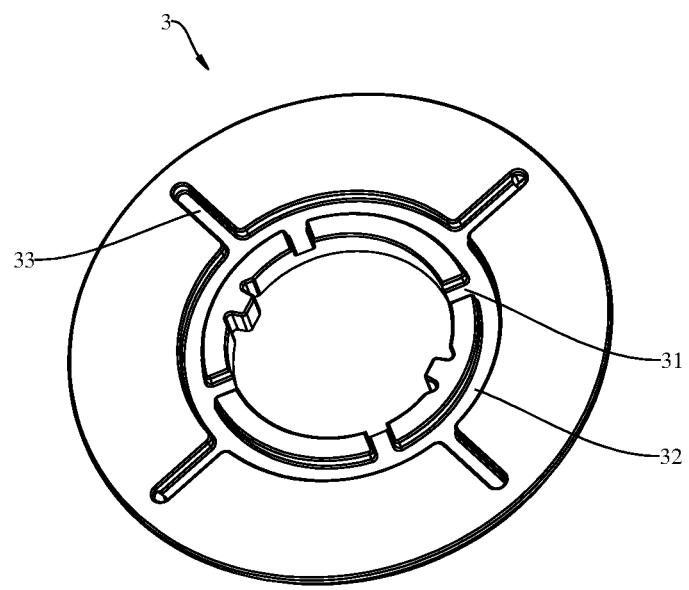
FIG. 7 is a schematic view showing a first end plate according to an embodiment of the present disclosure.
Figure 8:
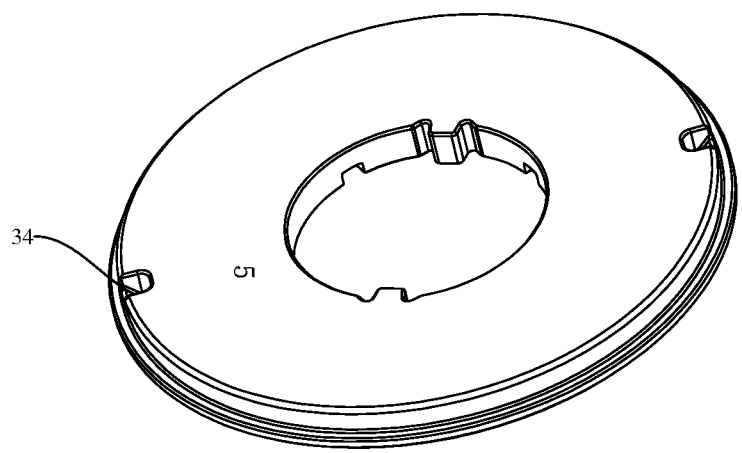
FIG. 8 is another schematic view showing the first end plate according to an embodiment of the present disclosure.

As illustrated in FIG. 7 and FIG. 8, in some embodiments, the first oil groove includes a first communication groove 31, a first guide groove 32, and a first oil outlet groove 33. A first end of the first communication groove 31 is in communication with the rotation shaft oil outlet 23. A second end of the first communication groove 31 is in communication with the first guide groove 32. The first guide groove 32 according to an embodiment, has an annular shape. The cooling oil in the rotation shaft oil path 21 enters the first communication groove 31 through the rotation shaft oil outlet 23, and flows from the first end of the first communication groove 31 to the second end of the first communication groove 31. Then, the cooling oil flows into the first guide groove 32 from the second end of the first communication groove 31, and then enters the first end of the first oil outlet groove 33 through the first guide groove 32. The cooling oil is partially injected through the second end of the first oil outlet groove 33 and the first end plate oil outlet 34. The remaining cooling oil enters the rotor oil path 11 through the first guide groove 32 and flows into the second oil groove.

Figure 9:
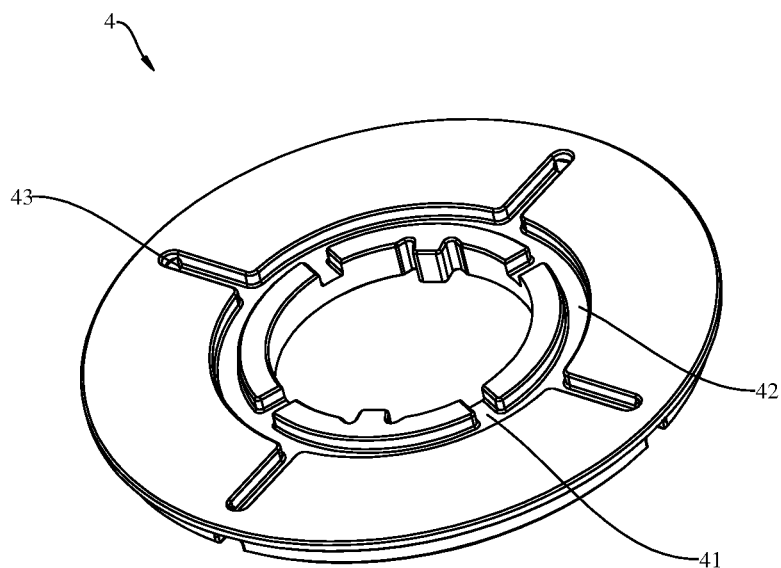
FIG. 9 is a schematic view showing a second end plate according to an embodiment of the present disclosure.
Figure 10:
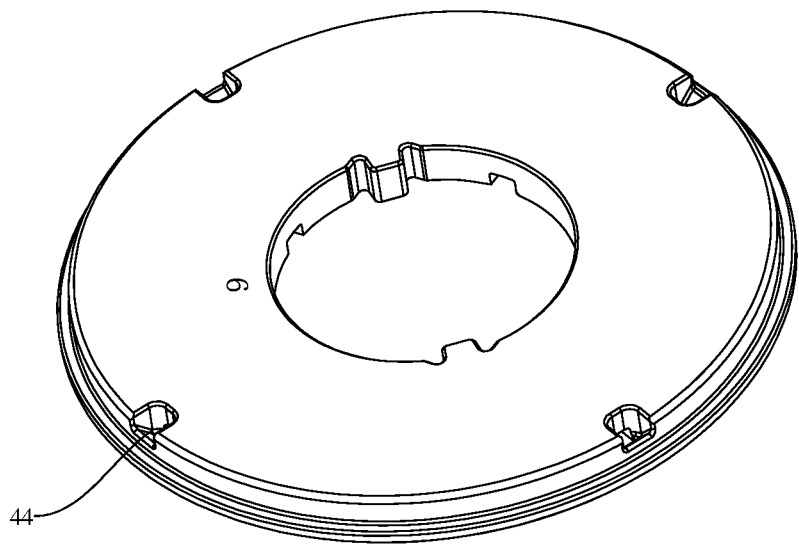
FIG. 10 is another schematic view showing the second end plate according to an embodiment of the present disclosure.

As illustrated in FIG. 9 and FIG. 10, the second oil groove includes a second guide groove 42 and a second oil outlet groove 43. The second guide groove 42 is in communication with the rotor oil path 11. The second guide groove 42 according to an embodiment, has an annular shape. A second end of the second oil outlet groove 43 is in communication with the second end plate oil outlet 44. The cooling oil in the rotor oil path 11 firstly flows into the second guide groove 42, and then flows into a first end of the second oil outlet groove 43 through the second guide groove 42, and finally is totally thrown out through the oil outlet 44 of the second end plate 4.

It should be noted that, in the above description, a difference between the first end plate 3 and the second end plate 4 is that the first end plate 3 has the first communication groove 31 in communication with the rotation shaft oil outlet 23, and the second end plate 4 has no communication groove. However, in order to facilitate manufacturing and reducing cost, for example, a same mold may be used when manufacturing the first end plate 3 and the second end plate 4. The second end plate 4 is also processed with a second communication groove 41 similar to the first communication groove 31. Since no rotation shaft oil outlet in communication with the second communication groove 41 is disposed on the rotation shaft, the cooling fluid cannot enter the second communication groove 41 from the rotation shaft oil outlet. Therefore, normal use of the second end plate 4 would not be affected.

In some embodiments, the first communication groove 31 and the first oil outlet groove 33 are staggered with each other in a radial direction of the first end plate 3. That is, the first communication groove 31 and the first oil outlet groove 33 are not aligned with each other.

Four first communication grooves 31 and four first oil outlet grooves 33 are provided. An included angle formed between two adjacent first oil outlet grooves 33 is 90 degrees, and an included angle formed between two adjacent first oil outlet grooves 33 is 90 degrees. Each of the first communication grooves 31 is staggered with the corresponding first oil outlet groove 33 in the radial direction of the first end plate 3. Thus, it is possible to ensure that when the rotation shaft oil outlets 23 is different from the first communication groove 31 in number, the cooling oil that entering the first communication grooves 31 through the rotation shaft oil outlets 23 can flow into the first guide grooves 32. Therefore, the cooling oil can flow into each of the first oil outlet grooves 33, instead of directly entering the first oil outlet grooves 33 from the first communication grooves 31.

In some embodiments, a plurality of first communication grooves 31 is provided and arranged at intervals in a circumferential direction of the first end plate 3. The plurality of first communication grooves 31 extends in the radial direction of the first end plate 3. A plurality of first oil outlet grooves 33 is provided and arranged at intervals in the circumferential direction of the first end plate 3. The plurality of first oil outlet grooves 33 extends in the radial direction of the first end plate 3. Similarly, a plurality of second oil outlet grooves 43 is provided and arranged at intervals in a circumferential direction of the second end plate 4. The plurality of second oil outlet grooves 43 extends in a radial direction of the second end plate 4. It should be noted that the number of the first communication groove 31 may be different from the number of the first oil outlet groove 33. The number of the first oil outlet groove 33 may be different from the number of the second oil outlet groove 43.

In some embodiments, N1 first end plate oil outlets 34 are provided and evenly arranged in the circumferential direction of the first end plate 3, and N2 second end plate oil outlets 44 are provided and evenly arranged in the circumferential direction of the second end plate 4, where N1<N2.

It should be noted that, when mounting a rotor assembly according to certain embodiments of the present disclosure into the stator, the second end plate corresponds to a wire outlet end of the stator winding. That is, a lead wire of the stator winding extends out of the housing of the motor from one side of the second end plate. The wire outlet end can generate more heat since the wire outlet end of the stator winding has the lead wire and is located at a position higher than a non-wire outlet end of the stator winding. t. In contrast, the non-wire outlet end can generate relatively less heat since it has no lead wire and is located at a position higher than the wire outlet end of the stator winding, the calorific value is relatively small. Therefore, by setting the number of the second end plate oil outlets greater than the number of the first end plate oil outlets, the cooling effect can be further improved. Of course, when the lead wire of the stator winding extends out of the housing of the motor from one side of the first end plate, the number of the first end plate oil outlets is correspondingly set greater than the number of the second end plate oil outlets.

In addition, the number of the first end plate oil outlets 34 and the number of the second end plate oil outlets 44 may be different from each other. In some embodiments, the number of the first end plate oil outlets 34 is smaller than the number of the second end plate oil outlets 44. Therefore, balanced cooling at both ends of the stator winding can be achieved better.

In some embodiments, each first end plate oil outlet 34 has a smaller hole diameter than each second end plate oil outlet 44. Therefore, the balanced cooling at both ends of the stator winding can be achieved better.

In some exemplary embodiments, two first end plate oil outlets 34 of the first end plate 3 are provided. Four second end plate oil outlets 44 are provided. The first end plate oil outlets 34 are arranged opposite to each other in the radial direction of the first end plate 3. The second end plate oil outlets 44 are evenly arranged in the circumferential direction of the second end plate 4.

As illustrated in FIG. 7 and FIG. 9, four first oil outlet grooves 33 and four second oil outlet grooves 43 are provided. Two of the first end plate oil outlets 34 are arranged in two opposite first oil outlet grooves 33. The four second end plate oil outlets 44 are arranged in four second oil outlet grooves 43, respectively. With this arrangement, it is possible to ensure that the cooling oil can partially enter the rotor oil path 11 through the first oil groove, and then be injected through the second end plate oil outlets 44.

In some embodiments, both an outlet end of each first end plate oil outlet 34 and an outlet end of each second end plate oil outlet 44 are opened towards the stator winding. That is, the outlet end of each first end plate oil outlet 34 is opened outwardly in the radial direction of the first end plate. In other embodiments, the outlet end of each second end plate oil outlet 44 is opened outwardly in the radial direction of the second end plate. Therefore, the cooling oil can be directly injected onto the end of the stator winding on the outer periphery of the rotor core 1. Thus, the cooling efficiency can be improved.

Figure 11:
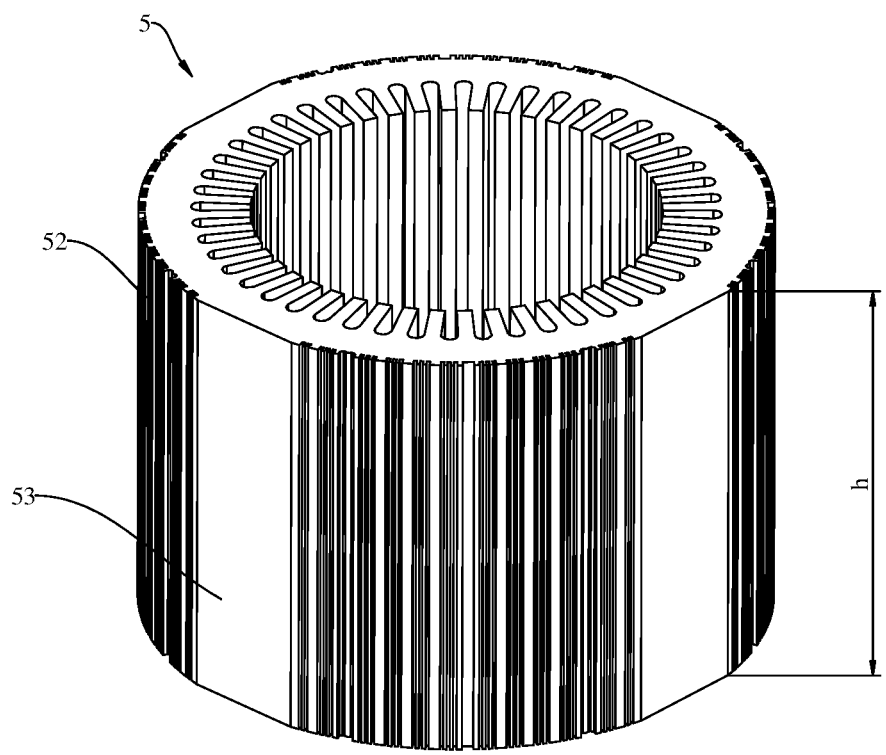
FIG. 11 is a schematic view showing a rotor core according to a first embodiment of the present disclosure.

As illustrated in FIG. 11, in some embodiments, a stator groove 52 and/or flat portion 53 extending in an axial direction of the stator core 5 are disposed on the outer peripheral wall of the stator core 5. The stator groove 52 and/or flat portion 53 are arranged at intervals in the circumferential direction of the stator core 5. A space between the stator groove 52 and/or the flat portion 53 and the inner peripheral wall of the housing 8 is the cooling oil channel 51. That is, there could be only the stator groove 52 or only the flat portion 53 disposed on the outer peripheral wall of the stator core 5, and there could be both of the stator groove 52 and the flat portion 53 disposed on the outer peripheral wall of the stator core 5.

The formation of the stator groove 52 can effectively increase a contact area between the cooling oil and the stator core 5 to allow the cooling oil to be brought in fully contact with the stator core 5. Thus, contact thermal resistance between the cooling fluid and the stator core 5 can be reduced, and heat dissipation efficiency of the stator core 5 can be improved. Further, a raw material of the stator core 5 can be saved. On one hand, providing the flat portion 53 can increase a volume of the cooling fluid flow path, and improve a flow state of the cooling oil, to allow the cooling oil to flow more sufficiently and evenly and reduce flow energy loss. On the other hand, providing the flat portion 53 can reduce a surface area of the cooling fluid flow path to reduce flow resistance of the flow path and improve the cooling efficiency. In addition, the flat portion 53 can further reduce a structural volume of the stator core 5, save the raw material, and reduce a manufacturing cost.

Figure 12:
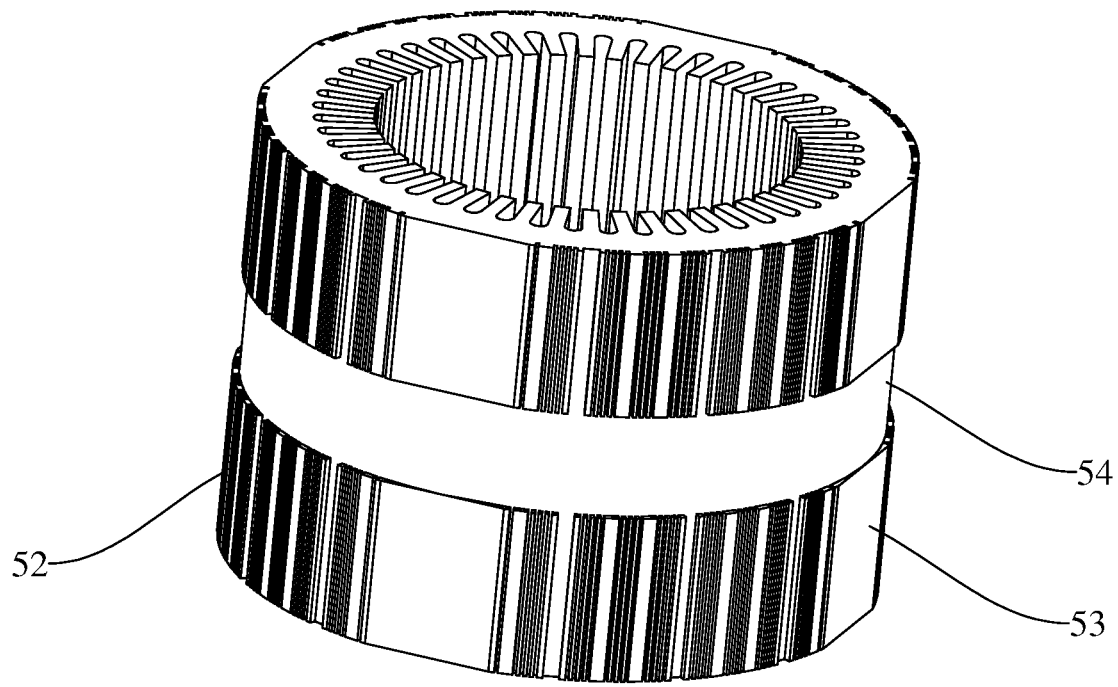
FIG. 12 is a schematic view showing a rotor core according to a second embodiment of the present disclosure.

As illustrated in FIG. 12, in some embodiments, at least one stator circumferential groove 54 is disposed on the outer peripheral wall of the stator core 5. The stator core 5 is divided into groove core segments and non-groove core segments in the axial direction thereof. The non-groove core segments include at least two non-groove core segments. It should be understood that a core segment where the stator circumferential groove 54 is located is the groove core segment. Other core segments are the non-groove core segments. Each groove core segment is disposed between two non-groove core segments. The arrangement of the stator circumferential groove 54 can also save the material, and effectively reduce cost of the raw material. In addition, the stator circumferential groove 54 can also increase the contact area between the cooling fluid and the stator core 5. Thus, the heat dissipation efficiency of the stator core 5 can be improved.

Figure 23:
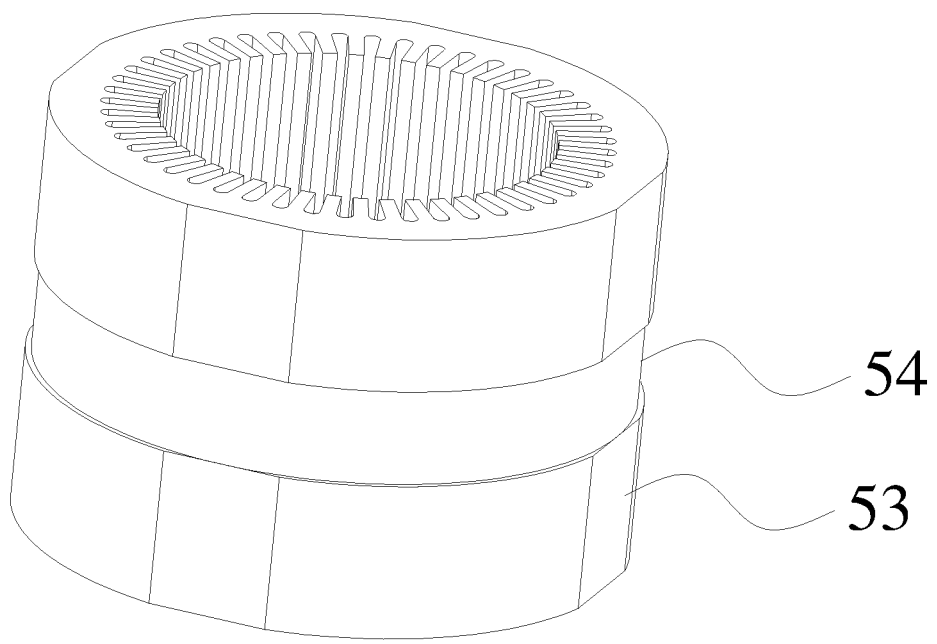
FIG. 23 is a schematic view showing a rotor core according to a third embodiment of the present disclosure.
Figure 27:
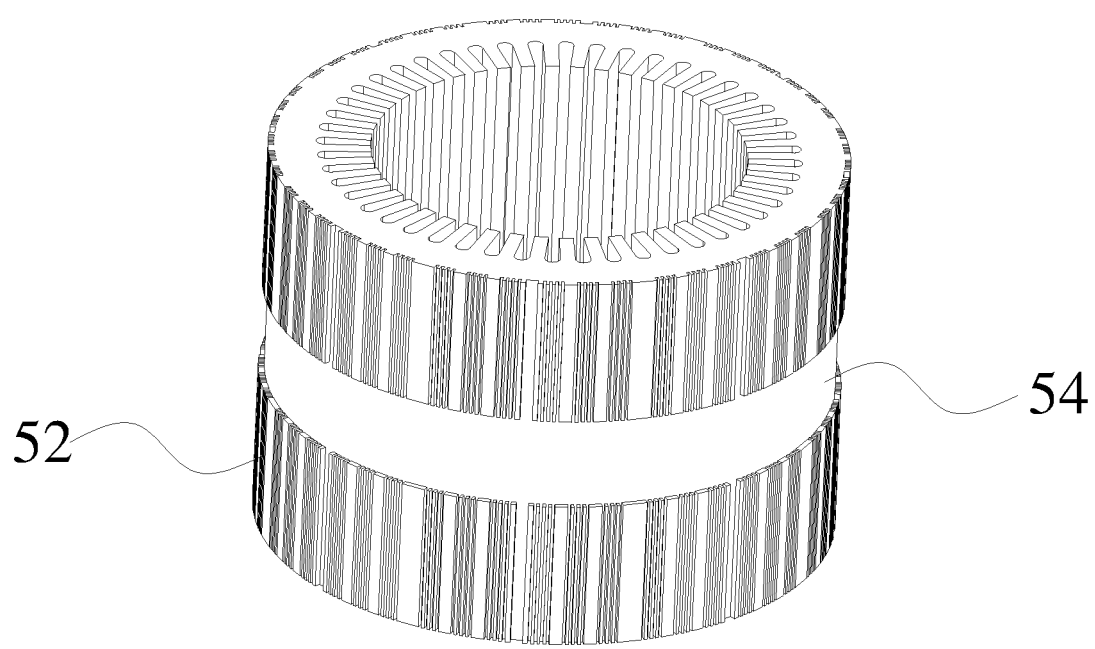
FIG. 27 is a schematic view showing a rotor core according to a fourth embodiment of the present disclosure.

As illustrated in FIG. 27, in some embodiments, one groove core segment and two non-groove core segments are provided, and the stator groove 52 in communication with the stator circumferential groove 54 are disposed on an outer peripheral wall of each of the two non-groove core segments. As illustrated in FIG. 23, in another embodiment, one groove core segment and two non-groove core segments are provided, and the flat portion 53 is disposed on an outer peripheral wall of each of the two non-groove core segments. As illustrated in FIG. 12, in the other embodiments, one groove core segment and two non-groove core segments are provided, and both the stator groove 52 and the flat portion 53 are disposed on the outer peripheral wall of each of the two non-groove core segments.

One or more groove core segments may be provided, and the present disclosure is not limited herein.

In some embodiments, one groove core segment is in communication with the housing oil inlet 81. That is, one stator circumferential groove is in communication with the housing oil inlet 81. The groove core segment is located at an axial middle position of the stator core 5. In some embodiments, a central axis of the housing oil inlet 81 is located in a central cross-section of the one groove core segment.

The groove core segment is in communication with the housing oil inlet 81. For example, after the cooling fluid enters the housing of the motor, the stator circumferential groove 54 at the groove core segment is filled with the cooling fluid firstly. Then, the cooling fluid is brought into in full contact with the outer peripheral wall of the stator core 5 through the stator groove 52 and the flat portion 53. For the flowing process of the cooling fluid, the cooling fluid flows from a middle position towards two ends. The cooling fluid can be quickly in total contact with the stator core 5 to dissipate the heat. Thus, the heat dissipation efficiency can be improved.

Further, the stator groove 52 and the flat portion 53 are disposed on the outer peripheral wall of the non-groove core segment. The stator groove 52, the flat portion 53, and the stator circumferential grooves 54 cooperate with each other. Thus, a volume of the stator core 5 is greatly reduced, and thus the cost is reduced. Further, the contact area between the cooling oil and the stator core 5 is greater, and the heat dissipation effect is better.

In some embodiments, the stator groove 52 has a rectangular shape. A depth of the stator groove 52 satisfies a relationship of $$a = \frac{k_1 L h}{R_{out} - R_{in}},$$

where a is the depth of the stator groove 52, $R_{out}$ is an outer diameter of the stator core 5, $R_{in}$ is an inner diameter of the stator core 5, L is a yoke thickness of the stator core 5, h is a stacking thickness of the stator core 5, and $k_1$ is a coefficient ranging from 0.05 to 0.1.

In order to further increase the contact area between the stator core 5 and the cooling fluid, the stator groove 52 is designed into a rectangular shape to enable both side surfaces and one bottom surface of the stator groove 52 to be in contact with the cooling fluid. Thus, it is possible to effectively improve the cooling effect of the cooling fluid on the stator core 5.

Figure 17:
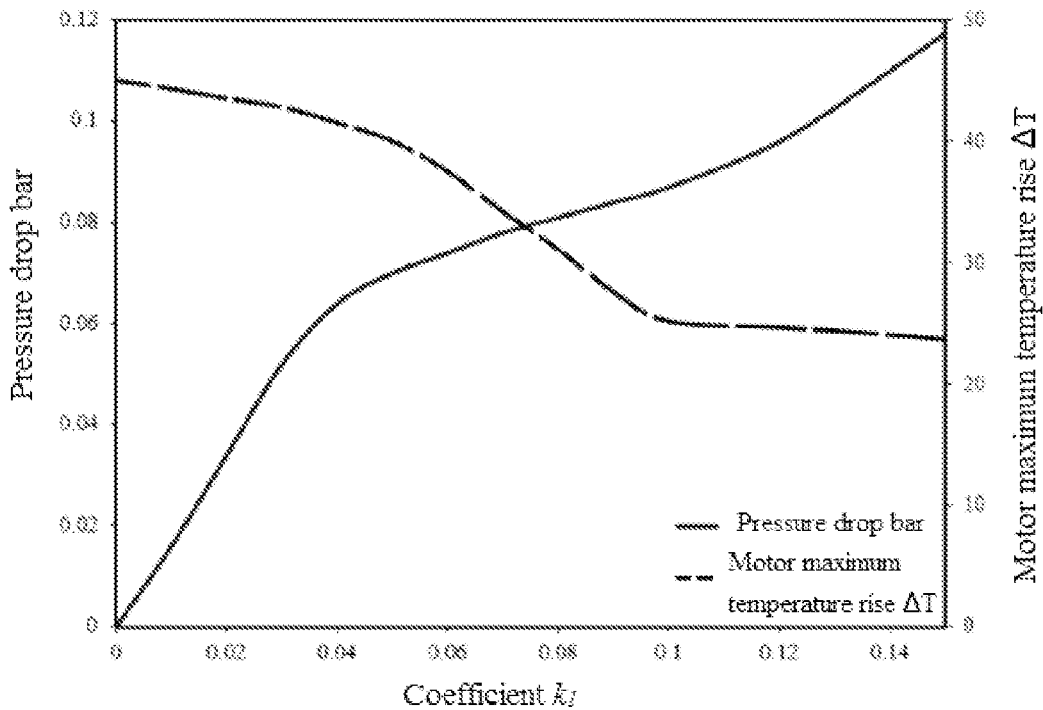
FIG. 17 is a schematic diagram of a plot between a coefficient $k_1$ of a motor and a pressure drop as well as a maximum temperature rise rate of the motor according to an embodiment of the present disclosure.

As illustrated in FIG. 17, the inventors has found through research and experimentation that as the coefficient $k_1$ gradually increases, a pressure drop of the motor (i.e., the flow resistance of the cooling fluid) also increases, and a maximum temperature rise rate of the motor decreases. The higher the pressure drop, the higher a lift of an oil pump for supplying the cooling fluid to the motor. A temperature rise of the motor corresponds to thermal performance of the motor. The smaller the temperature rise, the longer service life of the motor, and the better the performance of the motor. Through comprehensive consideration, the coefficient $k_1$ is determined to range from 0.05 to 0.1. In this value range, the pressure drop of the motor is relatively small, and the maximum temperature rise rate of the motor is relatively small Thus, the thermal performance of the motor is satisfactory, and the heat dissipation effect of the stator groove 52 is improved.

Figure 13:
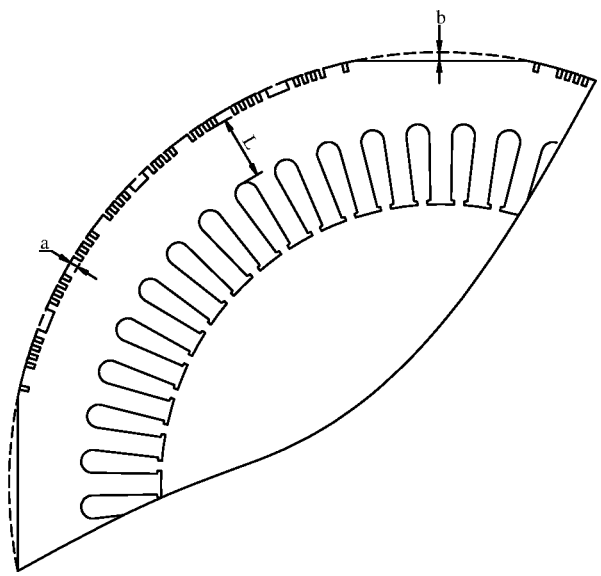
FIG. 13 is a schematic partial view showing a stator lamination of a rotor core according to a second embodiment of the present disclosure.
Figure 14:
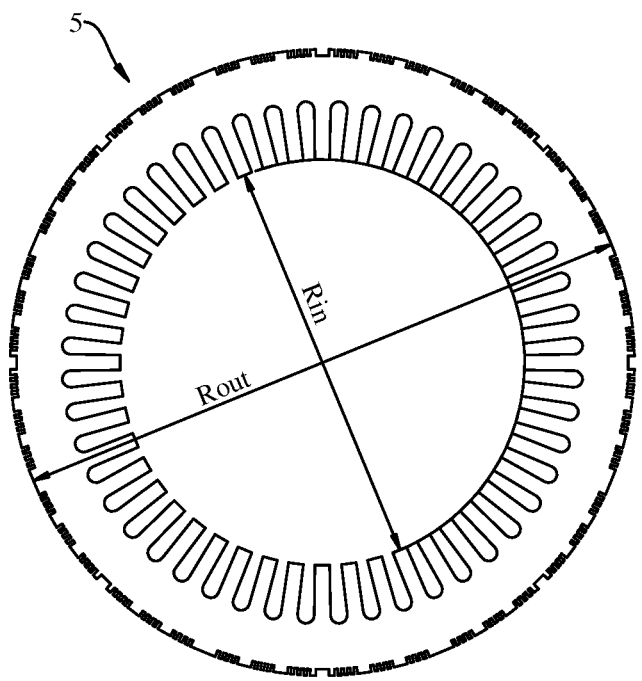
FIG. 14 is a schematic view showing a stator lamination of a rotor core according to a fourth embodiment of the present disclosure.

In some embodiments, as illustrated in FIG. 13 and FIG. 14, a depth of the flat portion 53 satisfies a relationship of $$b = \frac{k_2 L h}{R_{out} - R_{in}},$$

where b is the depth of the flat portion 53, $R_{out}$ is the outer diameter of the stator core 5, $R_{in}$ is the inner diameter of the stator core 5, L is the yoke thickness of the stator core 5, h is the stacking thickness of the stator core 5, and $k_2$ is the coefficient ranging from 0.05 to 0.1.

Figure 18:
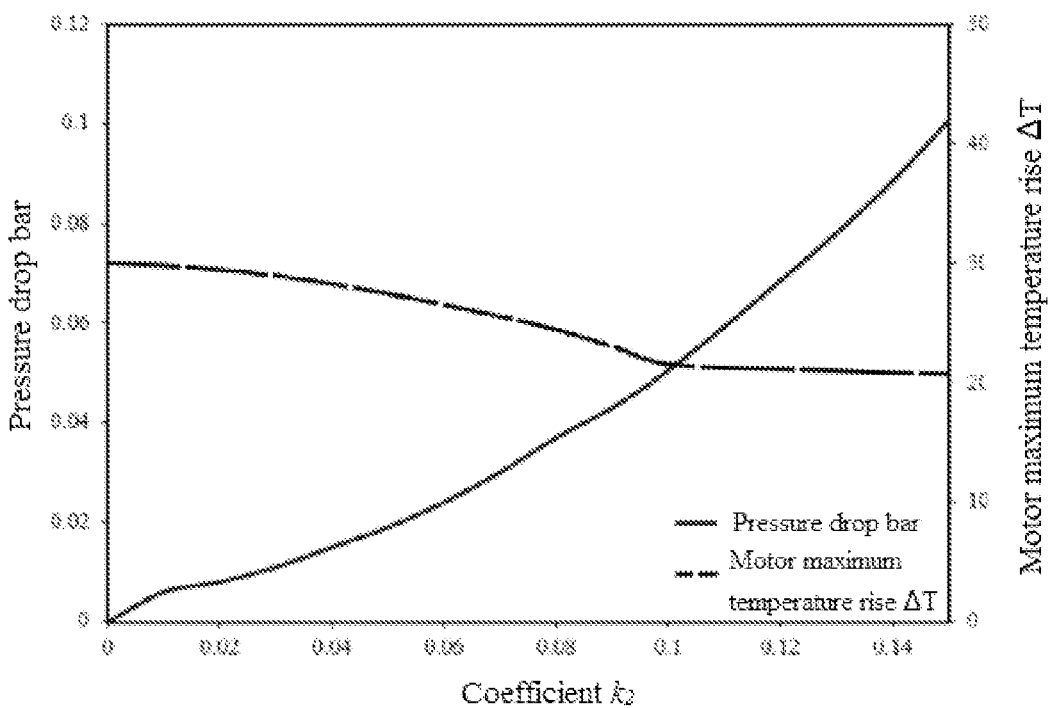
FIG. 18 is a schematic diagram of a plot between a coefficient $k_2$ of a motor and a pressure drop and a maximum temperature rise rate of the motor according to an embodiment of the present disclosure.

As illustrated in FIG. 18, the inventors have found through research and experimentation that as the coefficient $k_2$ increases, the pressure drop of the motor (the flow resistance of the cooling fluid) increases, and the maximum temperature rise rate of the motor gradually decreases. Through the comprehensive consideration, the coefficient is determined to range from 0.05 to 0.1. In this value range, the pressure drop of the motor is relatively small, and the maximum temperature rise rate of the motor is relatively small. Thus, the thermal performance of the motor is good, and the heat dissipation effect of the stator core 5 is better. Further, the raw material can be saved, and the cost of the raw material is reduced by 5.3%.

In some embodiments, the depth a of the stator groove 52 is greater than or equal to 1.5 mm and smaller than or equal to 2.5 mm. The inventors have found through research and experimentation that when the depth a of the stator groove is 1 mm, electromagnetic performance of the motor is reduced by 0.67%. When the depth a of the stator groove is 2 mm, the electromagnetic performance of the motor is reduced by 1.5%. When the depth a of the stator groove is 3 mm, the electromagnetic performance is reduced by 4.83%. Thus, it is advantageous for the depth a of the stator groove to range from 1.5 mm to 2.5 mm.

In some embodiments, the depth a of the stator groove 52 according to an embodiment, is 2 mm A width a of the stator groove 52 according to an embodiment, is 1 mm. As described above, when the depth a of the stator groove is 2 mm, the electromagnetic performance of the motor is reduced by 1.5%, which although has a certain influence on the electromagnetic performance, the influence is relatively small Meanwhile, the contact area between the cooling fluid and the stator core is also great, which can effectively improve the cooling efficiency of the motor.

Figure 24:
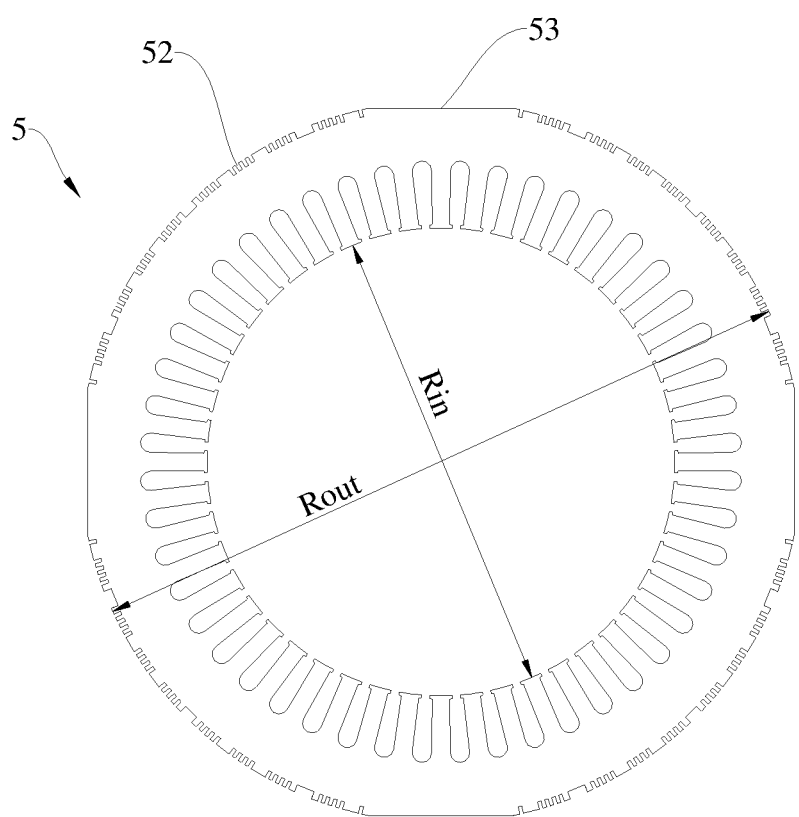
FIG. 24 is a schematic view showing a stator lamination of a rotor core according to an embodiment of the present disclosure.
Figure 25:
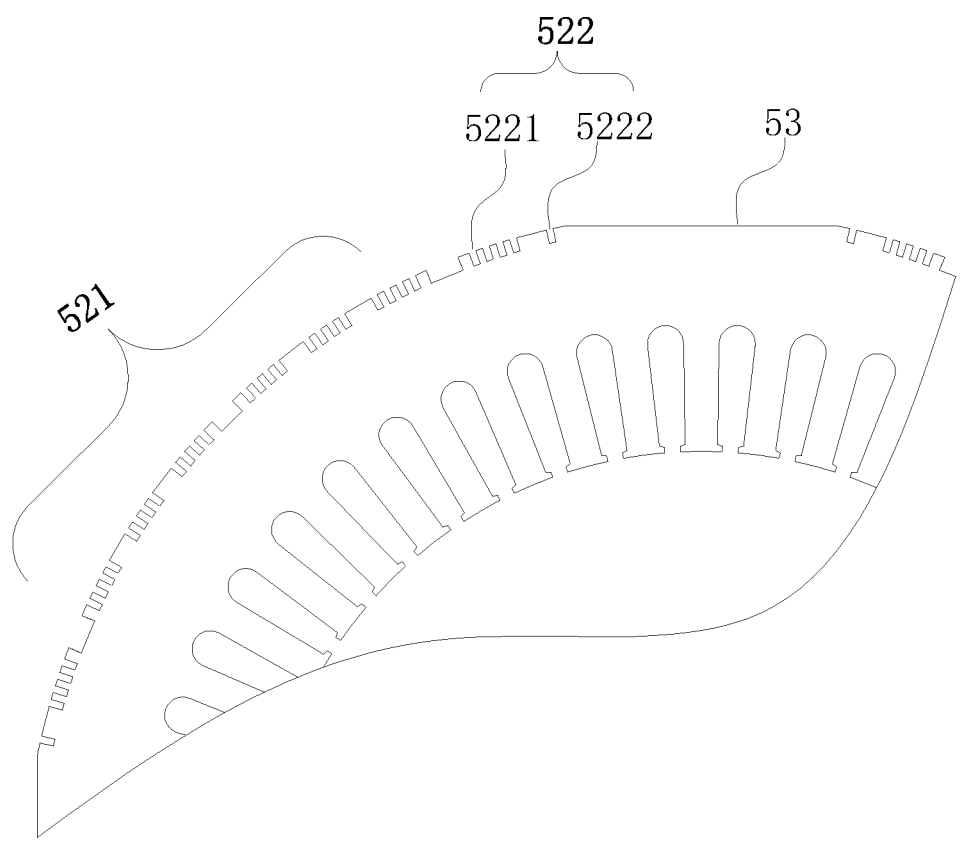
FIG. 25 is another partial enlarged schematic view of the stator lamination illustrated in FIG. 24.
Figure 26:
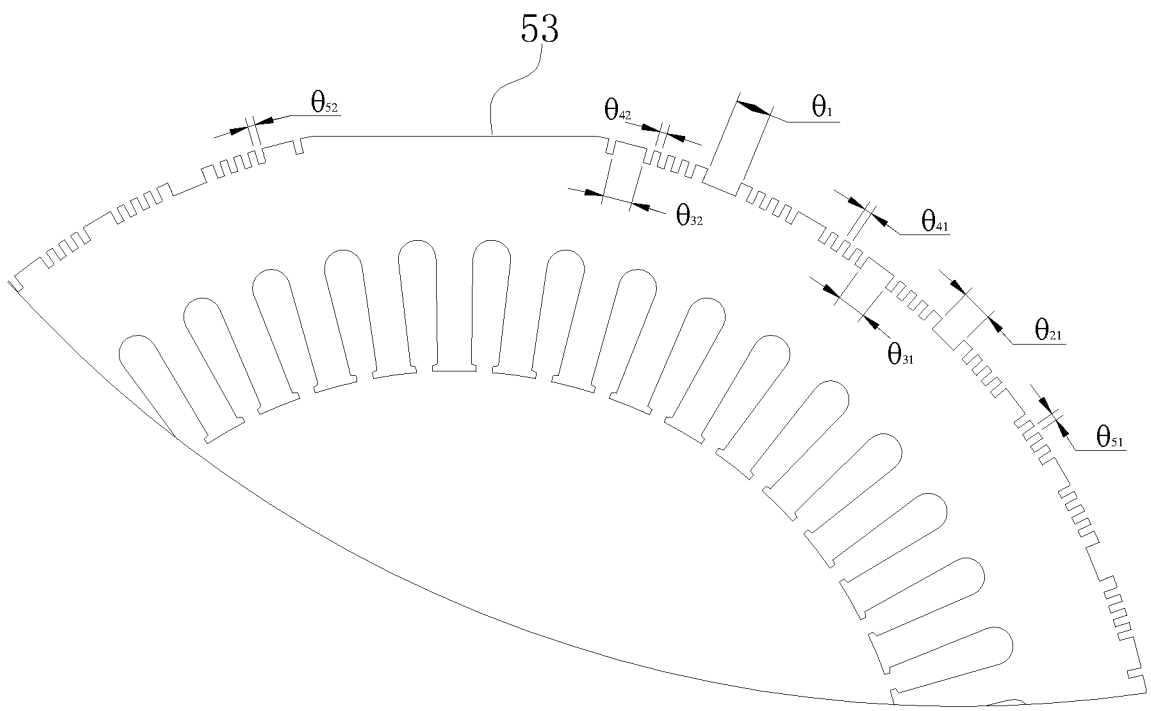
FIG. 26 is another partial enlarged schematic view of the stator lamination illustrated in FIG. 24.

As illustrated in FIGS. 24 to 26, in some embodiments, a plurality of stator grooves 52 is divided into a plurality of groups of stator grooves evenly arranged at intervals in the circumferential direction of the stator core 5. A central angle $\theta_1$ corresponding to a spacing between adjacent groups of stator grooves ranges from 1 degree to 5 degrees.

In some embodiments, a plurality of stator grooves 52 are divided into first groove groups 521 and second groove groups 522. The flat portion 53 are located in the second groove groups 522. The first groove groups 521 and the second groove groups 522 are arranged alternately in the circumferential direction of the stator core 5, and are distributed at intervals. Each of the second groove group 522 includes a first section 5221 and a second section 5222. The first section 5221 is close to the corresponding first groove group 521, and the second section 5222 is close to the corresponding flat portion 53. The number of the stator grooves 52 of the first section 5221 is greater than the number of the stator grooves 52 of the second section 5222. Since the flat portion 53 is located in the second groove group 522, one first section 5221 and one second section 5222 are located at two sides of the flat portion 53, respectively. That is, each of the second groove groups 522 has two first sections 5221 and two second sections 5222. A central angle $\theta_{32}$ corresponding to a spacing between the first section 5221 and the second section 5222 that are adjacent to each other ranges from 1 degree to 5 degrees. A central angle $\theta_{42}$ corresponding to a spacing between the stator grooves 52 of each section ranges from 0.5 degrees to 2 degrees. A central angle $\theta_{52}$ corresponding to each of the stator grooves 52 ranges from 0.5 degrees to 2 degrees.

As illustrated in FIG. 26, each the first groove group 521 is divided into a plurality of sets. FIG. 26 has two sets. Each of the plurality of sets includes a plurality of sections, and FIG. 26 illustrates three sections. A central angle $\theta_{21}$ corresponding to a spacing of a spacing groove between adjacent sets ranges from 1 degree to 5 degrees. A central angle $\theta_{31}$ corresponding to a spacing between adjacent sections of each of the plurality of sets ranges from 1 degree to 5 degrees. A central angle $\theta_{41}$ corresponding to a spacing between stator grooves 52 of each of the plurality of sections of each of the plurality of sets ranges from 0.5 degrees to 2 degrees. A central angle $\theta_{51}$ corresponding to each of the stator grooves 52 ranges from 0.5 degrees to 2 degrees. In some embodiments, a central angle corresponding to the flat portion 53 is 23 degrees.

By dividing the stator grooves 52 as described above, the cooling effect can be effectively improved.

In some embodiments, a plurality of fluid inlets is spirally distributed along the housing of the motor. The inventors have found through research and experimentation that the closer the housing oil inlet 81 is to the housing oil inlet 81, the better the cooling effect is. Therefore, by arranging the plurality of housing oil inlets 81, cooling capacity of the cooling fluid is enhanced, and the heat dissipation effect of the motor can be improved. In another embodiment, the plurality of housing oil inlets 81 is arranged at intervals in an axial direction of the housing 8. That is, the plurality of housing oil inlets 81 is arranged at intervals along a circumferential direction of the housing 8, and is further arranged at intervals in the axial direction of the housing 8. For example, the plurality of housing oil inlets 81 is spirally distributed on the housing 8.

As illustrated in FIG. 4, in some embodiments, a housing groove 82 is disposed on the inner peripheral wall of the housing 8, and extends in a circumferential direction of the housing of the motor. The housing oil inlet 81 is in communication with the housing groove 82. The housing groove 82 is formed as a part of the cooling fluid flow path. Thus, the cooling effect is further improved.

Figure 15:
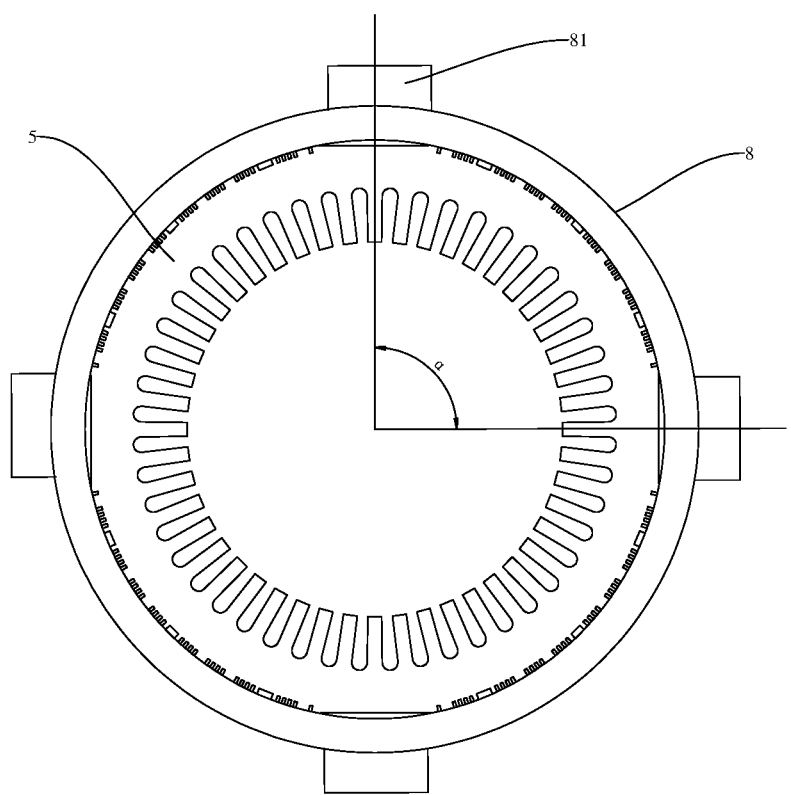
FIG. 15 is a schematic view showing a housing according to a second embodiment of the present disclosure.
Figure 16:
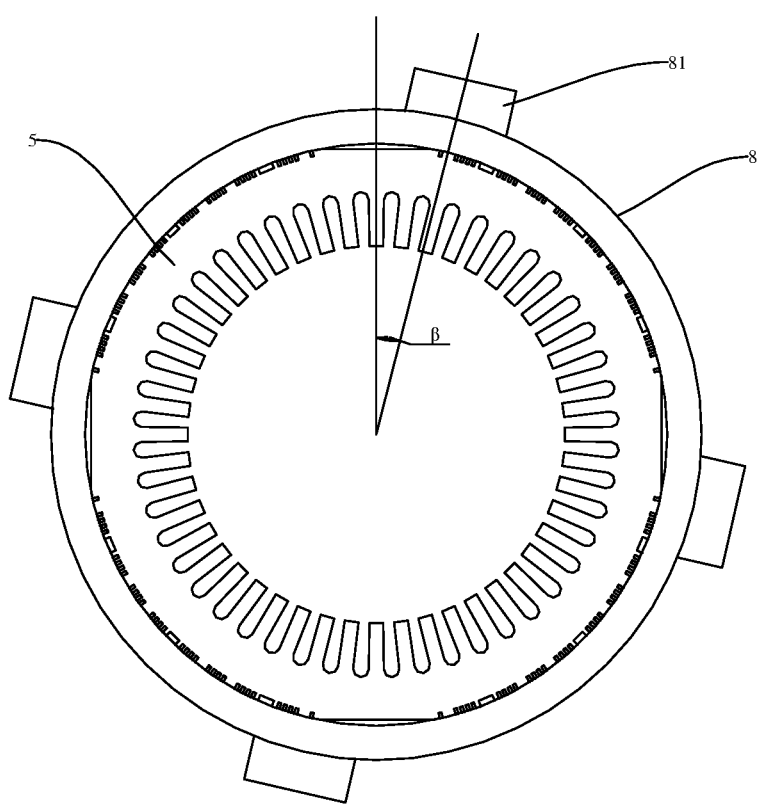
FIG. 16 is a schematic view showing a housing according to a third embodiment of the present disclosure.

As illustrated in FIG. 15 and FIG. 16, in some embodiments, a plurality of housing oil inlets 81 is provided and is distributed in the circumferential direction of the housing 8. An included angle α between central axes of the adjacent housing oil inlets 81 is smaller than or equal to 180 degrees. A central angle β between a projection of a center of the housing oil inlet 81 on a cross section of the stator core 5 and a projection of a center of a flat portion 53 closest to the housing oil inlet 81 on a cross section of the stator core 5 ranges from 0 to 5 degrees.

It should be understood that the above central angle β refers to that an included angle between a projection of a connecting straight line between a center of the fluid inlet and a circle center of the stator core 5 on the cross section of the stator core 5 and a projection of a connecting straight line between a midpoint of the flat portion 53 closest to the fluid inlet and the circle center of the stator core 5 on the cross section of the stator core 5 ranges from 0 to 5 degrees.

Figure 19:
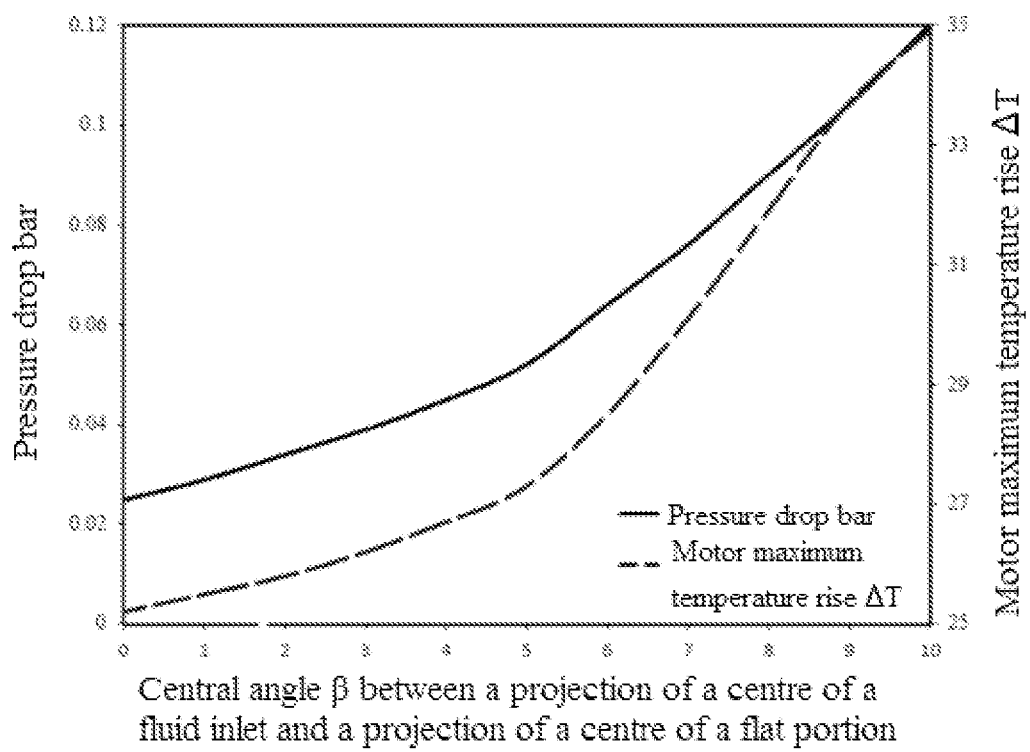
FIG. 19 is a schematic diagram of a plot shown a relationship between a central angle $\beta$ formed between a projection of a center of a housing oil inlet and a projection of a center of a flat portion, and a pressure drop and a maximum temperature rise rate of a motor according to an embodiment of the present disclosure.

As illustrated in FIG. 19, a horizontal axis of a plot is an angle of the above central angle β, and a vertical axis is the pressure drop and the maximum temperature rise of the motor. The inventors have found through research and experimentation that when the central angle β gradually increases from 0 to 5 degrees, increasing rates of the pressure drop and the maximum temperature rise of the motor are slower (slopes of two curves are small). When the angle of the central angle β gradually increases from 5 degrees to 10 degrees, the increasing rates of a pressure drop of a cooling system and the maximum temperature rise of the motor are obviously accelerated (the slopes of the two curves increase). Thus, there is a higher requirement for the lift of the oil pump, which may result in increased cost of the motor. Thus, the thermal performance of the motor is poor. Therefore, the central angle between the projection of the center of the fluid inlet on the cross section of the stator core 5 and the projection of the center of the flat portion 53 closest to the fluid inlet on the cross section of the stator core 5 is set to range from 0 to 5 degrees.

Figure 22:
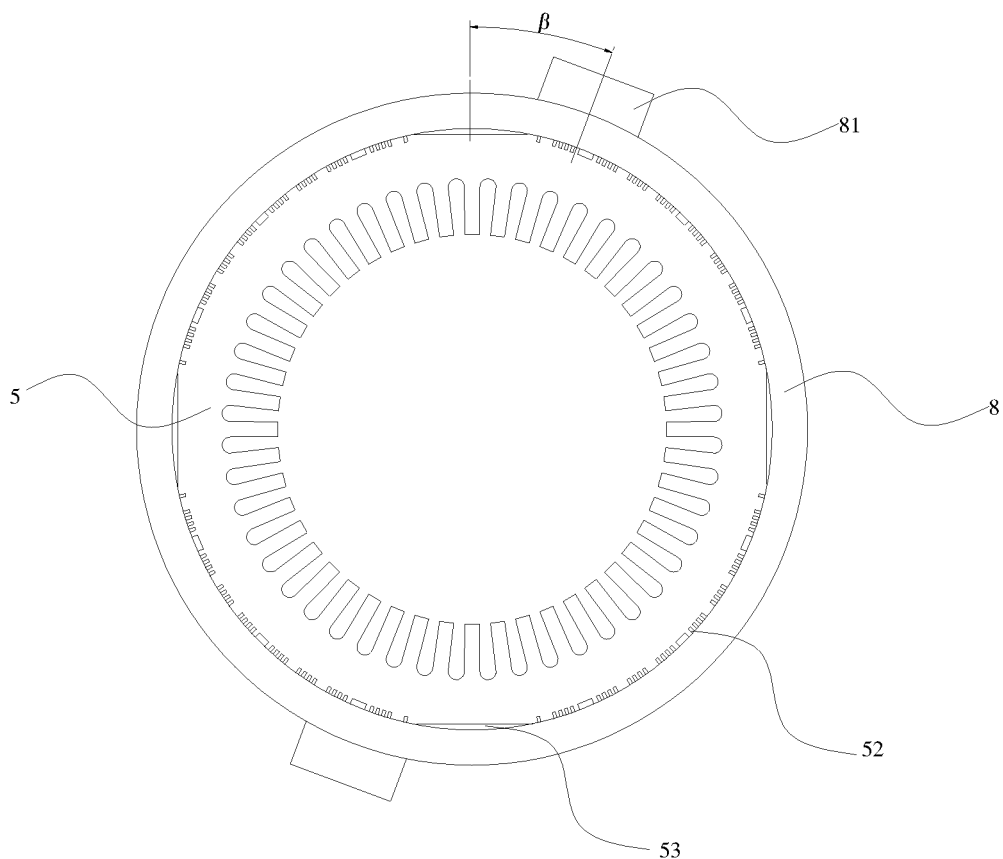
FIG. 22 is a schematic view showing a housing according to a fourth embodiment of the present disclosure.

As illustrated in FIG. 22, in some embodiments, four flat portions 53 are provided, and two housing oil inlet 81 are provided. The central angle β between the projection of the center of the housing oil inlet 81 on the cross section of the stator core 5 and the projection of the center of the flat portion 53 closest to the housing oil inlet 81 on the cross section of the stator core 5 can be 0 degree. In some other embodiments, as illustrated in FIG. 15, the four flat portions 53 are provided, and two housing oil inlets 81 are provided. The central angle β between the projection of the center of the housing oil inlet 81 on the cross section of the stator core 5 and the projection of the center of the flat portion 53 closest to the housing oil inlet 81 on the cross section of the stator core 5 is 0 degree. In some embodiments, the number of the fluid inlets is smaller than the number of the flat portions, and each of the fluid inlets corresponds to one flat portion.

A vehicle according to the embodiments of the present disclosure includes a motor that may be the motor according to the above embodiments. The performance of the vehicle can be improved by improving the heat dissipation efficiency of the motor. The vehicle may be a pure electric vehicle, or may be another form of new energy vehicle. Of course, in the embodiments of the present disclosure, the vehicle is not limited herein.

In the description of the present disclosure, it should be understood that, the orientation or position relationship indicated by the terms such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc., is based on the orientation or position relationship shown in the accompanying drawings, and is merely for the convenience of describing the present disclosure and simplifying the description, rather than indicating or implying that the associated device or element must have a specific orientation, or be constructed and operated in a specific orientation, and therefore cannot be understood as a limitation to the present disclosure.

In addition, the terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. In the description of the present disclosure, "plurality" means at least two, such as two, three, etc., unless otherwise specifically defined.

In the present disclosure, unless otherwise clearly specified and limited, terms such as "installed", "connected", "coupled", "fixed" and the like should be understood in a broad sense. For example, it may be a fixed connection or a detachable connection or an integral connection; a mechanical connection or an electrical connection or in communication with each other; a direct connection or an indirect connection through an intermediate; and internal communication of two components or the interaction relationship between two components, unless otherwise clearly limited. For those of ordinary skill in the art, the specific meaning of the above-mentioned terms in the present disclosure can be understood according to specific circumstances.

In the present disclosure, unless expressly stipulated and defined otherwise, the first feature "on" or "under" the second feature may mean that the first feature is in direct contact with the second feature, or the first and second features are in indirect contact through an intermediate. Moreover, the first feature "above" the second feature may mean that the first feature is directly above or obliquely above the second feature, or simply mean that the level of the first feature is higher than that of the second feature. The first feature "below" the second feature may mean that the first feature is directly below or obliquely below the second feature, or simply mean that the level of the first feature is smaller than that of the second feature.

In the description of this specification, descriptions with reference to the terms "an embodiment", "some embodiments", "examples", "specific examples", or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner. In addition, those skilled in the art can combine the different embodiments or examples and the features of the different embodiments or examples described in this specification without contradicting each other.

Although the embodiments of the present disclosure have been shown and described above, it should be understood that the above embodiments are exemplary and should not be construed as limiting the present disclosure. Those of ordinary skill in the art can make changes, modifications, substitutions and variation to the above embodiments within the scope of the present disclosure.

What is claimed is:

1. A motor comprising:
a housing having an inner cavity and a housing oil inlet;
a stator comprising a stator core and a stator winding, the stator being disposed in the inner cavity of the housing, wherein a cooling oil channel is defined between an outer peripheral wall of the stator core and an inner peripheral wall of the housing, the cooling oil channel being in communication with the housing oil inlet;
a first end cover mounted at a first end of the housing;
a second end cover having an end cover oil inlet and mounted at a second end of the housing;
a first oil injection ring disposed on an inner side of the first end cover, wherein an oil injection space in communication with the cooling oil channel is defined between an outer peripheral wall of the first oil injection ring and the inner peripheral wall of the housing, and wherein a plurality of first oil injection holes is disposed on the first oil injection ring and arranged at intervals in a circumferential direction of the first oil injection ring, the plurality of first oil injection holes being in communication with the oil injection space to allow cooling oil to be injected from an outer periphery of the stator towards a first end of the stator winding;
a rotor comprising:
a rotor core, wherein a rotor oil path is formed in the rotor core;
a rotor magnet steel; and
a rotation shaft, wherein a rotation shaft oil path is formed in the rotation shaft, wherein a rotation shaft oil inlet and a rotation shaft oil outlet are disposed on the rotation shaft and are both in communication with the rotation shaft oil path, wherein a first end of the rotation shaft penetrates the first end cover and extends out of the housing, and wherein the rotation shaft oil inlet is in communication with the end cover oil inlet;
a first end plate disposed at a first end of the rotor core and engaged with the rotation shaft, wherein a first oil groove is disposed on an inner side surface of the first end plate opposite to the rotor core, and is in communication with the rotation shaft oil outlet and the rotor oil path, respectively, and wherein a first end plate oil outlet is disposed on an outer side surface of the first end plate and configured to communicate the first oil groove with the inner cavity of the housing; and
a second end plate disposed at a second end of the rotor core and engaged with the rotation shaft, wherein a second oil groove is disposed on an inner side surface of the second end plate opposite to the rotor core, and is in communication with the rotor oil path, and wherein a second end plate oil outlet is disposed on an outer side surface of the second end plate and configured to communicate the second oil groove with the inner cavity of the housing.

2. The motor according to claim 1, further comprising a second oil injection ring disposed on an inner side of the second end cover, wherein:
an oil injection space in communication with the cooling oil channel is defined between an outer peripheral wall of the second oil injection ring and the inner peripheral wall of the housing, and
a plurality of second oil injection holes is disposed on the second oil injection ring and arranged at intervals in a circumferential direction of the second oil injection ring, the plurality of second oil injection holes being in communication with the oil injection space to allow the cooling oil to be injected from the outer periphery of the stator towards a second end of the stator winding.

3. The motor according to claim 2, wherein:
the first oil injection ring is detachably mounted on the first end cover, or the first oil injection ring and the first end cover are integrally formed, and/or
the second oil injection ring is detachably mounted on the second end cover, or the second oil injection ring and the second end cover are integrally formed.

4. The motor according to claim 2, wherein:
each of the plurality of first oil injection holes has a circular cross-section, and a cross-section area of one of two adjacent first oil injection holes at a higher position is greater than a cross-section area of the other of the two adjacent first oil injection holes at a lower position, and/or
each of the plurality of second oil injection holes has a circular cross-section, and a cross-section area of one of two adjacent second oil injection holes at a higher position is greater than a cross-section area of the other of the two adjacent second oil injection holes at a lower position.

5. The motor according to claim 2, wherein:
the first oil injection ring is divided into a first upper ring segment located above a center of the first oil injection ring, and a first lower ring segment located below the center of the first oil injection ring, a cross-section area of each first oil injection hole of the first upper ring segment gradually increasing in a radial direction of the first oil injection ring from outside to inside, and a cross-section area of each first oil injection hole of the first lower ring segment gradually decreasing in the radial direction of the first oil injection ring from outside to inside, and/or
the second oil injection ring is divided into a second upper ring segment located above a center of the second oil injection ring, and a second lower ring segment located below the center of the second oil injection ring, a cross-section area of each second oil injection hole of the second upper ring segment gradually increasing in a radial direction of the second oil injection ring from outside to inside, and a cross-section area of each second oil injection hole of the second lower ring segment gradually decreasing in the radial direction of the second oil injection ring from outside to inside.

6. The motor according to claim 1, wherein:
the first oil groove comprises:
- a first guide groove;
- a first communication groove having a first end in communication with the rotation shaft oil outlet and a second end in communication with the first guide groove; and
- a first oil outlet groove having a first end in communication with the first guide groove, and a second end in communication with the first end plate oil outlet, and the second oil groove comprises:
- a second annular groove in communication with the rotor oil path; and
- a second oil outlet groove having a first end in communication with the second annular groove and a second end in communication with the second end plate oil outlet.

7. The motor according to claim 6, wherein the first communication groove and the first oil outlet groove are staggered with each other in a radial direction of the first end plate.

8. The motor according to claim 6, wherein:
a plurality of first communication grooves is provided and arranged at intervals in a circumferential direction of the first end plate, the plurality of first communication grooves extending in the radial direction of the first end plate,
a plurality of first oil outlet grooves is provided and arranged at intervals in the circumferential direction of the first end plate, the plurality of first oil outlet grooves extending in the radial direction of the first end plate, and
a plurality of second oil outlet grooves is provided and arranged at intervals in a circumferential direction of the second end plate, the plurality of second oil outlet grooves extending in a radial direction of the second end plate.

9. The motor according to claim 1, wherein:
an outlet end of the first end plate oil outlet is opened outwardly in a radial direction of the first end plate, and/or
an outlet end of the second end plate oil outlet is opened outwardly in a radial direction of the second end plate.

10. The motor according to claim 1, wherein:
a lead wire of the stator winding extends out of one side of the second end cover,
N1 first end plate oil outlets are provided and evenly arranged in a circumferential direction of the first end plate, and
N2 second end plate oil outlets are provided and evenly arranged in a circumferential direction of the second end plate, where N1<N2.

11. The motor according to claim 1, wherein a hole diameter of the first end plate oil outlet is smaller than a hole diameter of the second end plate oil outlet.

12. The motor according to claim 1, wherein both an outlet end of the first end plate oil outlet and an outlet end of the second end plate oil outlet are opened towards the stator winding.

13. The motor according to claim 1, wherein:
a stator groove and/or a flat portion extending in an axial direction of the stator core are disposed on the outer peripheral wall of the stator core, and
the cooling oil channel is defined by the stator groove and/or the flat portion.

14. The motor according to claim 13, wherein:
at least one stator circumferential groove is disposed on the outer peripheral wall of the stator core, and extends in a circumferential direction of the stator core, to divide the stator core into a plurality of non-groove core segments and at least one groove core segment in the axial direction of the stator core, and
the stator groove and/or the flat portion extending in the axial direction of the stator core and distributed at intervals in the circumferential direction of the stator core are disposed on an outer peripheral wall of each of the plurality of non-groove core segments.

15. The motor according to claim 14, wherein:
the at least one groove core segment comprises one groove core segment,
the plurality of non-groove core segments comprises two non-groove core segments, and
the stator groove and/or the flat portion are disposed on an outer peripheral wall of each of the two non-groove core segments.

16. The motor according to claim 15, wherein the one groove core segment is located at an axial middle position of the stator core.

17. The motor according to claim 16, wherein a central axis of the housing oil inlet is located in a central cross-section of the one groove core segment.

18. The motor according to claim 13, wherein:
the stator groove has a rectangular shape, and
a depth of the stator groove satisfies a relationship of $$a = \frac{k_1 L h}{R_{out} - R_{in}},$$

where a is the depth of the stator groove, $R_{out}$ is an outer diameter of the stator, $R_{in}$ is an inner diameter of the stator, L is a yoke thickness of the stator, h is a stacking thickness of the stator, and $k_1$ is a coefficient ranging from 0.05 to 0.1.

19. The motor according to claim 18, wherein a depth of the flat portion satisfies a relationship of $$b = \frac{k_2 L h}{R_{out} - R_{in}},$$

where b is the depth of the flat portion, $R_{out}$ is an outer diameter of the stator, $R_{in}$ is an inner diameter of the stator, L is a yoke thickness of the stator, h is a stacking thickness of the stator, and $k_1$ is a coefficient ranging from 0.05 to 0.1.

20. The motor according to claim 13, wherein:
a plurality of stator grooves is divided into a plurality of groups of stator grooves evenly distributed at intervals in the circumferential direction of the stator core, and
a central angle $\theta_1$ corresponding to a spacing between adjacent groups of stator grooves ranges from 1 degree to 5 degrees.

21. The motor according to claim 20, wherein:
the plurality of groups of stator grooves is divided into first groove groups and second groove groups that are arranged alternately in the circumferential direction of the stator core,
the flat portion is located in the second groove groups,
each of the second groove groups is divided into two first sections adjacent to a corresponding first groove group and two second sections adjacent to a corresponding flat portion, wherein:

the number of stator grooves of each of the first sections is greater than the number of stator grooves of each of the second sections, a central angle $\theta_{32}$ corresponding to a spacing between the first section and the second section that are adjacent to each other ranges from 1 degree to 5 degrees, a central angle $\theta_{42}$ corresponding to a spacing between the stator grooves of each section ranges from 0.5 degrees to 2 degrees, and a central angle $\theta_{52}$ corresponding to each of the stator grooves ranges from 0.5 degrees to 2 degrees, and each of the first groove groups is divided into a plurality of sets, each of the plurality of sets comprising a plurality of sections, wherein:

a central angle $\theta_{21}$ corresponding to a spacing groove between adjacent sets ranges from 1 degree to 5 degrees, a central angle $\theta_{31}$ corresponding to a spacing between adjacent sections of each of the plurality of sets ranges from 1 degree to 5 degrees, a central angle $\theta_{41}$ corresponding to a spacing between stator grooves of each of the plurality of sections of each of the plurality of sets ranges from 0.5 degrees to 2 degrees, and a central angle $\theta_{51}$ corresponding to each of the stator grooves ranges from 0.5 degrees to 2 degrees.

22. The motor according to claim 13, wherein a depth of the stator groove ranges from 1.5 mm to 2.5 mm.

23. The motor according to claim 1, wherein:

a housing groove is disposed on the inner peripheral wall of the housing, and extends in a circumferential direction of the housing, and the housing oil inlet is in communication with the housing groove.

24. A vehicle comprising the motor according to claim 1.

* * * * *